United States Patent
Ikarashi

(10) Patent No.: US 11,258,909 B2
(45) Date of Patent: Feb. 22, 2022

(54) PRINTING APPARATUS, PRINTING SYSTEM, AND METHOD

(71) Applicant: CANON KABUSHIKI KAISHA, Tokyo (JP)

(72) Inventor: Yumi Ikarashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/884,271

(22) Filed: May 27, 2020

(65) Prior Publication Data
US 2020/0382658 A1 Dec. 3, 2020

(30) Foreign Application Priority Data
May 31, 2019 (JP) .............................. JP2019-103178

(51) Int. Cl.
 *H04N 1/00* (2006.01)
 *G06F 3/0482* (2013.01)
 *B41J 2/175* (2006.01)

(52) U.S. Cl.
 CPC ...... *H04N 1/00281* (2013.01); *B41J 2/17566* (2013.01); *G06F 3/0482* (2013.01); *H04N 2201/006* (2013.01); *H04N 2201/0094* (2013.01)

(58) Field of Classification Search
 CPC ......... H04N 1/00281; H04N 2201/006; H04N 2201/0094; H04N 1/00076; B41J 2/17566; B41J 2/1752; B41J 29/393; B41J 2/175; B41J 2/17546; B41J 2/17523; G06F 3/0482; G06K 15/4075
 See application file for complete search history.

(56) References Cited

U.S. PATENT DOCUMENTS

| 2008/0129801 A1* | 6/2008 | Umeda | B41J 2/17513 347/85 |
| 2009/0051745 A1* | 2/2009 | Watanabe | B41J 2/17566 347/86 |
| 2017/0038923 A1* | 2/2017 | Tsuzuki | H04N 1/00307 |

FOREIGN PATENT DOCUMENTS

JP 2017-037427 A 2/2017

\* cited by examiner

*Primary Examiner* — Iriana Cruz
(74) *Attorney, Agent, or Firm* — Venable LLP

(57) ABSTRACT

A printing apparatus includes a subunit including a plurality of installation racks in each of which a consumable member can be installed, and a main unit configured to receive supply from the consumable member installed in the subunit and perform printing. The printing apparatus acquires consumable member information including (i) color information and (ii) information indicating a positional relationship between the subunit and the consumable member, wherein the information indicating the positional relationship includes a direction and a distance between the subunit and the consumable member, stores information, including the color information and information indicating a positional relationship between the subunit and the consumable member, of each of the plurality of installation racks, and determines, based on the acquired consumable member information, whether the consumable member exists at a position corresponding to a predetermined installation rack of the plurality of installation racks.

18 Claims, 22 Drawing Sheets

| INK TANK ID | | 1 | 2 | 3 | 4 |
|---|---|---|---|---|---|
| COLOR | | M | C | Y | K |
| SUPPLY FLAG | | 0 | 0 | 0 | 0 |
| POSITION INFORMATION | DISTANCE | d2-d1 | d2-d1 | d3-d2 | d3-d2 |
| | ANGLE | 150° | 40° | 20° | 0° |

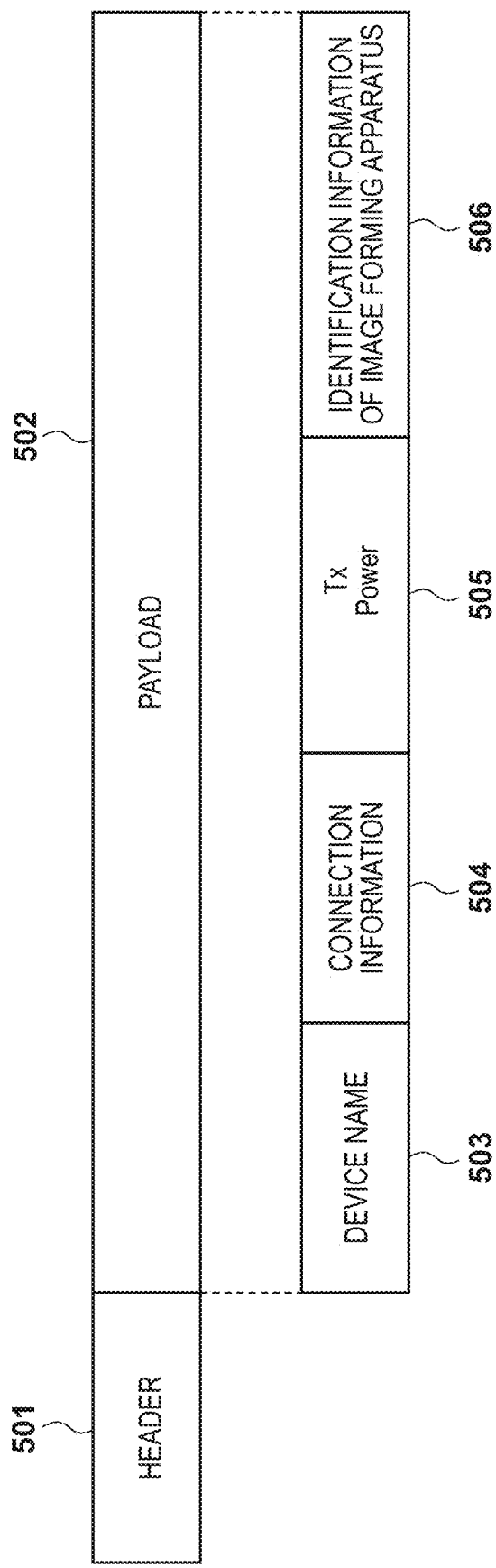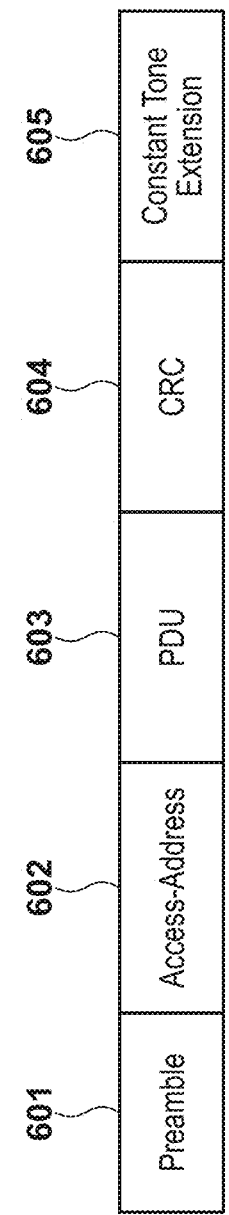

FIG. 11

| STATE NUMBER | 1 | 2 | 3 | 4 | 5 | 6 | 7 | 8 |
|---|---|---|---|---|---|---|---|---|
| INK TANK RECEPTION STATE (1101) | NONE | INFORMATION IN RECEPTION LIST | INFORMATION IN RECEPTION LIST | INFORMATION IN RECEPTION LIST | INFORMATION IN RECEPTION LIST | INFORMATION IN RECEPTION LIST | INFORMATION IN RECEPTION LIST | NONE |
| SUPPLY FLAG (1102) | 0 | 0 | 0 | 0 | 0 | 0 | 1 | 1 |
| INK TANK STATE (1103) | UNINSTALLED | UNINSTALLED | EXCHANGE | INSTALL | INSTALL | INSTALL | EXCHANGE | UNINSTALLED |
| SUPPLY STATE (1104) | SUPPLIED STATE | SUPPLIED STATE | SUPPLIED STATE | SUPPLIED STATE | SUPPLY WAITING | SUPPLYING | SUPPLIED STATE | SUPPLIED STATE |
| INK TANK EXCHANGE POSSIBILITY (1105) | POSSIBLE | INSERTION ERROR | POSSIBLE | POSSIBLE | DETACHMENT IMPOSSIBLE | DETACHMENT IMPOSSIBLE | POSSIBLE | POSSIBLE |

SHORT DISTANCE WIRELESS COMMUNICATION UNIT

F I G. 18
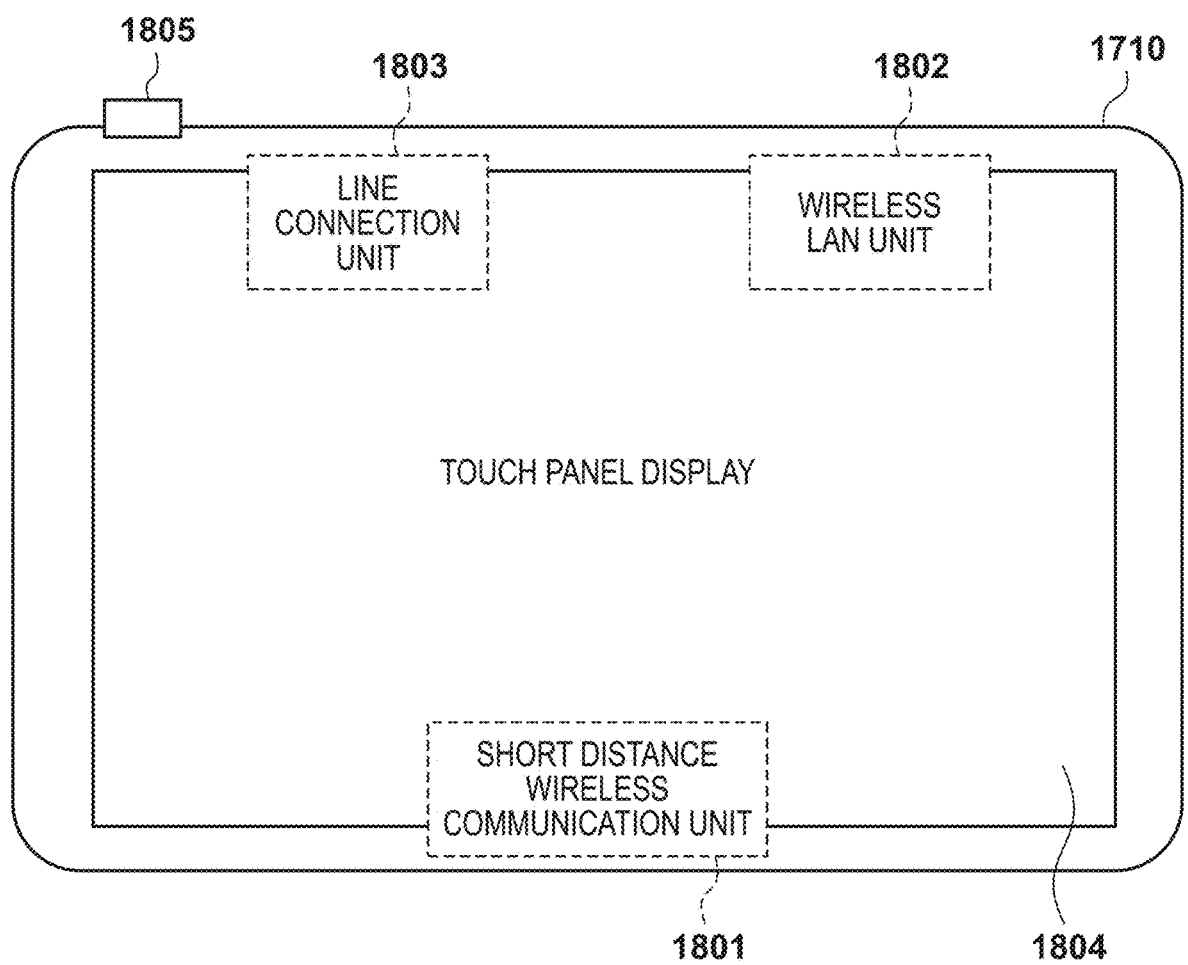

FIG. 23

| INK TANK ID | | 1 | 2 | 3 | 4 |
|---|---|---|---|---|---|
| COLOR | | M | C | Y | K |
| SUPPLY FLAG | | 0 | 0 | 0 | 0 |
| POSITION INFORMATION | DISTANCE | d2−d1 | d2−d1 | d3−d2 | d3−d2 |
| | ANGLE | 150° | 40° | 20° | 0° |

F I G. 24

| RACK NUMBER | | 1 | 2 | 3 | 4 | 5 | 6 |
|---|---|---|---|---|---|---|---|
| COLOR | | C | M | Y | K | C | K |
| EXCHANGE AREA | DISTANCE | d3-d2 | d2-d1 | d1 | d1 | d2-d1 | d3-d2 |
| | ANGLE | 150°–180° | 120°–180° | 90°–180° | 0°–90° | 0°–60° | 0°–30° |
| INK TANK STATE | | UNINSTALLED | UNINSTALLED | UNINSTALLED | INSTALLED | UNINSTALLED | INSTALLED |
| SUPPLY STATE | | SUPPLIED | SUPPLIED | SUPPLIED | SUPPLY WAITING | SUPPLIED | SUPPLIED |
| INK TANK EXCHANGE POSSIBILITY | | POSSIBLE | POSSIBLE | INSERTION ERROR | DETACHMENT IMPOSSIBLE | POSSIBLE | POSSIBLE |
| POSITION INFORMATION | DISTANCE | d3-d2 | d2-d1 | d1 | d1 | d2-d1 | d3-d2 |
| | ANGLE | 180° | 180° | 180° | 0° | 0° | 0° |

PRINTING APPARATUS, PRINTING SYSTEM, AND METHOD

BACKGROUND OF THE INVENTION

Field of the Invention

The present invention relates to a printing apparatus for printing using a consumable member, a printing system, and a method.

Description of the Related Art

Japanese Patent Laid-Open No. 2017-037427 discloses a technique of specifying the distance between devices using Bluetooth communication. On the other hand, in Bluetooth5.1, direction detection using an Angle of Arrival (AoA) or Angle of Departure (AoD) can be performed.

Between a plurality of devices located at a distance close to each other, accuracy is required to be raised concerning the configuration of position determination.

SUMMARY OF THE INVENTION

The present invention provides a technique of performing accurate position determination using a signal of short distance wireless communication.

The present invention in one aspect provides a printing apparatus including a subunit including a plurality of installation racks in each of which a consumable member can be installed, and a main unit configured to receive supply from the consumable member installed in the subunit and perform printing, comprising: a first acquisition unit configured to acquire relative position information between the subunit and the consumable member using a signal of short distance wireless communication transmitted from the subunit; and a determination unit configured to determine, based on the relative position information acquired by the first acquisition unit, whether the consumable member exists at a position corresponding to a predetermined installation rack of the plurality of installation racks.

According to the present invention, it is possible to perform accurate position determination using a signal of short distance wireless communication.

Further features of the present invention will become apparent from the following description of exemplary embodiments with reference to the attached drawings.

BRIEF DESCRIPTION OF THE DRAWINGS

FIG. 5 is a view showing the structure of advertisement information;

FIG. 6 is a view showing the structure of advertisement information;

FIG. 11 is a view showing the combinations of information in an ink tank reception list and a rack-specific list;

FIG. 18 is a view showing the outer appearance of a terminal device;

FIG. 23 is a view showing an example of the ink tank reception list; and

FIG. 24 is a view showing an example of the rack-specific list.

DESCRIPTION OF THE EMBODIMENTS

Figure 1:
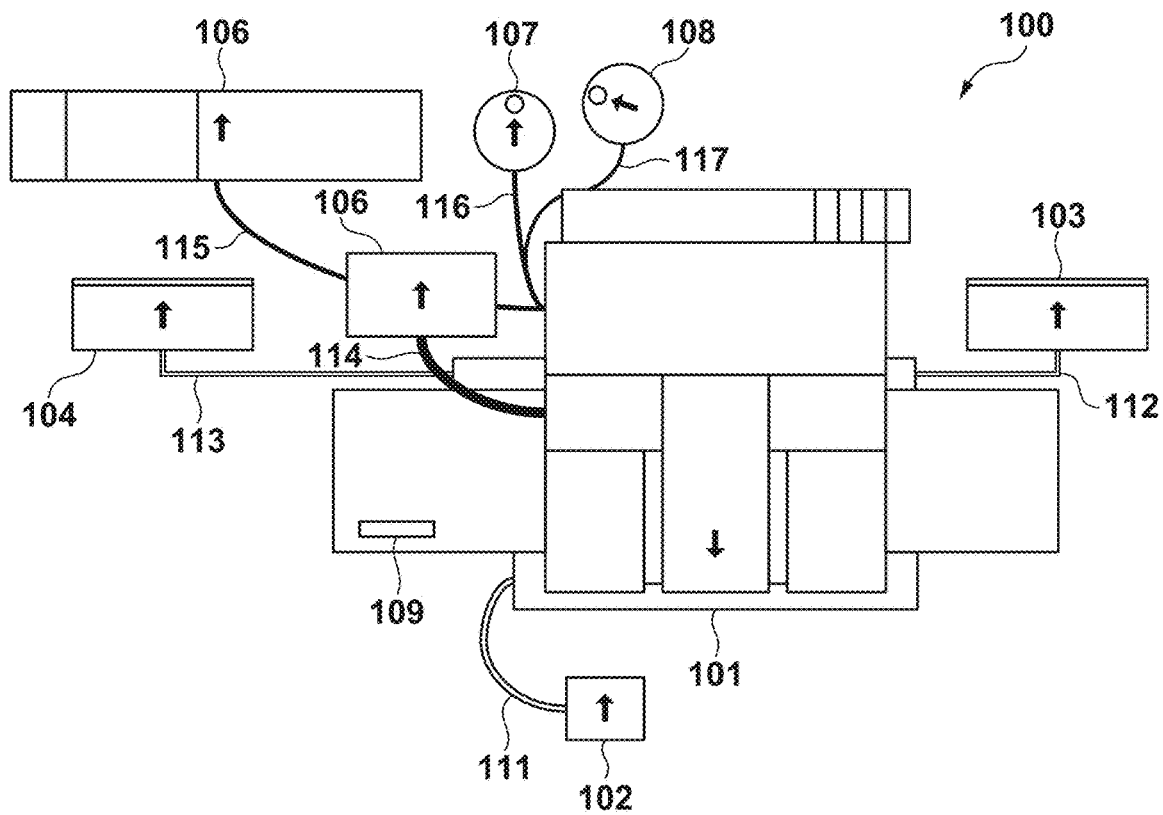
FIG. 1 is a view showing a printing apparatus viewed from above.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

An arrangement according to this embodiment will be described below using ink tank exchange of a large inkjet printing apparatus as an example. The large inkjet printing apparatus according to this embodiment is a printing apparatus formed from a plurality of units, and an ink rack (ink tank unit) capable of receiving an ink tank corresponding to each color is constructed separately from a main body (main unit) that prints on a print medium. Ink serving as a printing material is configured to be supplied from the ink tank unit to the main unit via a cable.

Figure 2:
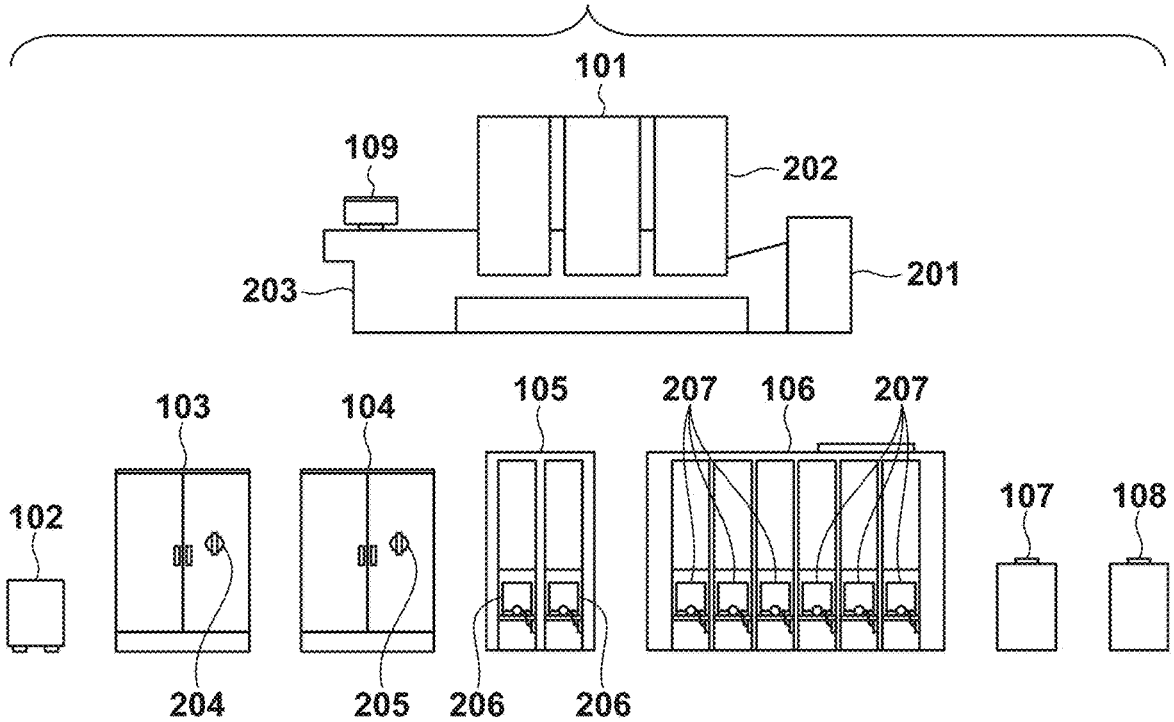
FIG. 2 is a view showing the printing apparatus viewed from the front side.

FIG. 1 is a view showing a large inkjet printing apparatus (to be referred to as a printing apparatus hereinafter) 100 viewed from above. FIG. 2 is a view showing the printing apparatus 100 viewed from the front side. Note that an arrow in each unit shown in FIG. 1 indicates the front direction of the unit. A main unit 101 is a unit that performs a printing operation for a print medium such as a print sheet in the printing apparatus 100. The print medium includes a film and the like, and is assumed to be a sheet hereinafter as one example. The main unit 101 includes a sheet feeding unit 201 that performs a feeding operation of stacked sheets, a printing unit 202 that discharges ink from an inkjet printhead (to be referred to as a printhead hereinafter) onto a sheet and forms an image on the sheet, and a discharge unit 203 that discharges the sheet with the image formed. Also, the main unit 101 includes a touch panel display 109 serving as a user interface whereby the main unit 101 can display a user interface screen and accept a user operation such as settings. In addition, the main unit 101 incorporates an electrical electronic board (control unit) (not shown) configured to control each unit.

A DFE (Digital Front End) 102 is a management device (server) that manages image data and print jobs to be executed by the printing apparatus 100. The DFE 102 is connected to an external network via a network cable (not shown) and can accept a print job from the network. The DFE 102 is also connected to the main unit 101 via a DFE cable 111. The DFE cable 111 is a communication cable configured to transmit/receive image data and commands.

A first power supply unit 103 is one of two power supply units configured to supply power to the printing apparatus 100, and includes a first power supply unit breaker switch 204, as shown in FIG. 2. The first power supply unit 103 is connected to the main unit 101 via a first power supply unit cable 112. The first power supply unit cable 112 is a cable group that bundles electric cables used to supply a large capacity current and communication cables used to perform communication between units. A second power supply unit 104 is one of two power supply units configured to supply power to the printing apparatus 100, and includes a second power supply unit breaker switch 205, as shown in FIG. 2. The second power supply unit 104 is connected to the main unit 101 via a second power supply unit cable 113. The second power supply unit cable 113 is a cable group that bundles electric cables used to supply a large capacity current and communication cables used to perform communication between units.

A consumable liquid unit 105 is a unit configured to install consumable liquid tanks 206 used in the image formation process of the printing apparatus 100. Consumable liquids include a cleaning liquid used to clean the printhead, a coating agent used to improve image quality, and the like. The consumable liquid unit 105 is connected to the main unit 101 via a consumable liquid unit cable 114. The consumable liquid unit cable 114 is a cable group that bundles supply tubes used to supply the consumable liquids to the printing unit 202, and communication cables used to perform communication between units. The consumable liquid unit 105 also includes mechanisms configured to suck the consumable liquids from the installed consumable liquid tanks 206, and can supply the consumable liquids to the main unit 101 via the supply tubes of the consumable liquid unit cable 114.

An ink tank unit 106 is a unit configured to install ink tanks 207 that hold inks of colors to be discharged from the printhead. The ink tank unit 106 is connected to the main unit 101 via an ink tank unit cable 115. The ink tank unit cable 115 is a cable group that bundles supply tubes used to supply the inks of the colors to the printing unit 202, and communication cables used to perform communication between units. The ink tank unit 106 also includes mechanisms configured to suck the inks from the installed ink tanks 207 of the colors, and can supply the consumables to the main unit 101 via the ink tank unit cable 115.

A first waste liquid tank 107 is a tank configured to temporarily store used or excess consumable liquids and the like. The first waste liquid tank 107 is connected to the main unit 101 via a first waste liquid tank cable 116. The first waste liquid tank cable 116 is a cable group that bundles discharge tubes used to pass waste liquids discharged from the main unit 101, and communication cables used to perform communication between units. A second waste liquid tank 108 is a tank configured to temporarily store excess inks and the like. The second waste liquid tank 108 is connected to the main unit 101 via a second waste liquid tank cable 117. The second waste liquid tank cable 117 is a cable group that bundles discharge tubes used to pass waste liquids discharged from the main unit 101, and communication cables used to perform communication between units.

The arrangement of the printing apparatus 100 is not limited to the arrangement shown in FIGS. 1 and 2, and may appropriately include another unit. For example, an external power supply cable connected to the first power supply unit 103 or the second power supply unit 104, a duct used to release an exhaust gas generated by a printing operation, and the like may be provided.

As shown in FIG. 1, in the printing apparatus 100, a plurality of units are connected by cables. Hence, each unit can flexibly be installed and laid out in accordance with the installation environment of the printing apparatus 100. That is, the arrangement of the devices shown in FIGS. 1 and 2 is merely an example, and the relative installation positions and directions of the units with respect to the main unit 101 can flexibly be changed.

An example of an operation performed by an operator (user) for the units of the printing apparatus 100 will be described next. For the main unit 101, the operator places sheets on the sheet feeding unit 201, and carries out printed products from the discharge unit 203. The operator can confirm various kinds of device states or perform an execution operation of functions such as printing and automatic maintenance by operating the touch panel display 109. The operator also performs a print job submitting operation or the like for the DFE 102, and operates the breaker switches 204 and 205 of the first power supply unit 103 and the second power supply unit 104 before the operation of the apparatus. The operator also exchanges consumable liquid tanks in the consumable liquid unit 105, and exchanges the ink tanks 207 of the colors in the ink tank unit 106. For the first waste liquid tank 107 and the second waste liquid tank 108, the operator performs an operation of discharging waste liquids in the tanks and transferring them into metal drums to discard.

The control units of the units of the printing apparatus 100 will be described next with reference to FIG. 3. The main unit 101 has the arrangement of a main unit control unit 310 shown in FIG. 3. Each of the DFE 102, the first power supply unit 103, the second power supply unit 104, the consumable liquid unit 105, the ink tank unit 106, the first waste liquid tank 107, and the second waste liquid tank 108 has the arrangement of a subunit control unit 320 shown in FIG. 3.

The main unit control unit 310 includes a UI control unit 317, a CPU 311, a RAM 312, a ROM 313, a communication unit 315, a short distance wireless communication unit 314, and a mechanism control unit 316. The UI control unit 317 is a module configured to accept data input or an operation instruction from the user and output a screen for the user, and controls, for example, the touch panel display 109.

The CPU 311 is a system control unit and, comprehensively controls the entire main unit 101. The ROM 313 stores control programs to be executed by the CPU 311, data tables, an embedded operating system (to be referred to as OS hereinafter) program, and the like. For example, each control program stored in the ROM 313 performs software execution control such as scheduling, task switch, and interrupt processing under the management of the OS.

The RAM 312 is formed by an SRAM (Static Random Access Memory) or the like, which needs a backup power supply. Note that the RAM 312 can store data such as program control variables without volatilizing them because the data are held by a primary battery (not shown) for data backup. Memory areas configured to store the setting information, management data, and the like of the main unit control unit 310 are also provided in the RAM 312. The RAM 312 is also used as the main memory and the work memory of the CPU 311.

The communication unit 315 is a component connected to a communication unit 325 of the subunit control unit 320 via a network 300 to execute data communication between the units. Note that the network 300 is formed as, for example, a LAN including the cables shown in FIG. 1.

The short distance wireless communication unit 314 is a component configured to execute data communication by short distance wireless communication, and performs communication by a communication method different from that of the communication unit 315. The short distance wireless communication unit 314 can be connected to a short distance wireless communication unit 324 in the subunit control unit 320. Note that in this embodiment, Bluetooth5.1 is used as the communication method of the short distance wireless communication unit 314. Note that Bluetooth5.1 includes both the Classic Bluetooth standard and the Bluetooth Low Energy (BLE) standard. In this embodiment, BLE is used. In the BLE standard of Bluetooth5.1, the transmission method of a radio wave from each of a plurality of antennas is controlled. With this arrangement, a communication unit on a scanner side can calculate the direction of a communication unit on an advertiser side and the distance between them. The mechanism control unit 316 controls mechanisms such as various kinds of motors and sensors.

The subunit control unit 320 includes a ROM 323, a RAM 322, a CPU 321, a mechanism control unit 326, the communication unit 325, and the short distance wireless communication unit 324. The CPU 321 to the mechanism control unit 326 in the subunit control unit 320 are the same as described concerning the CPU 311 to the mechanism control unit 316 in the main unit control unit 310.

Figure 3:
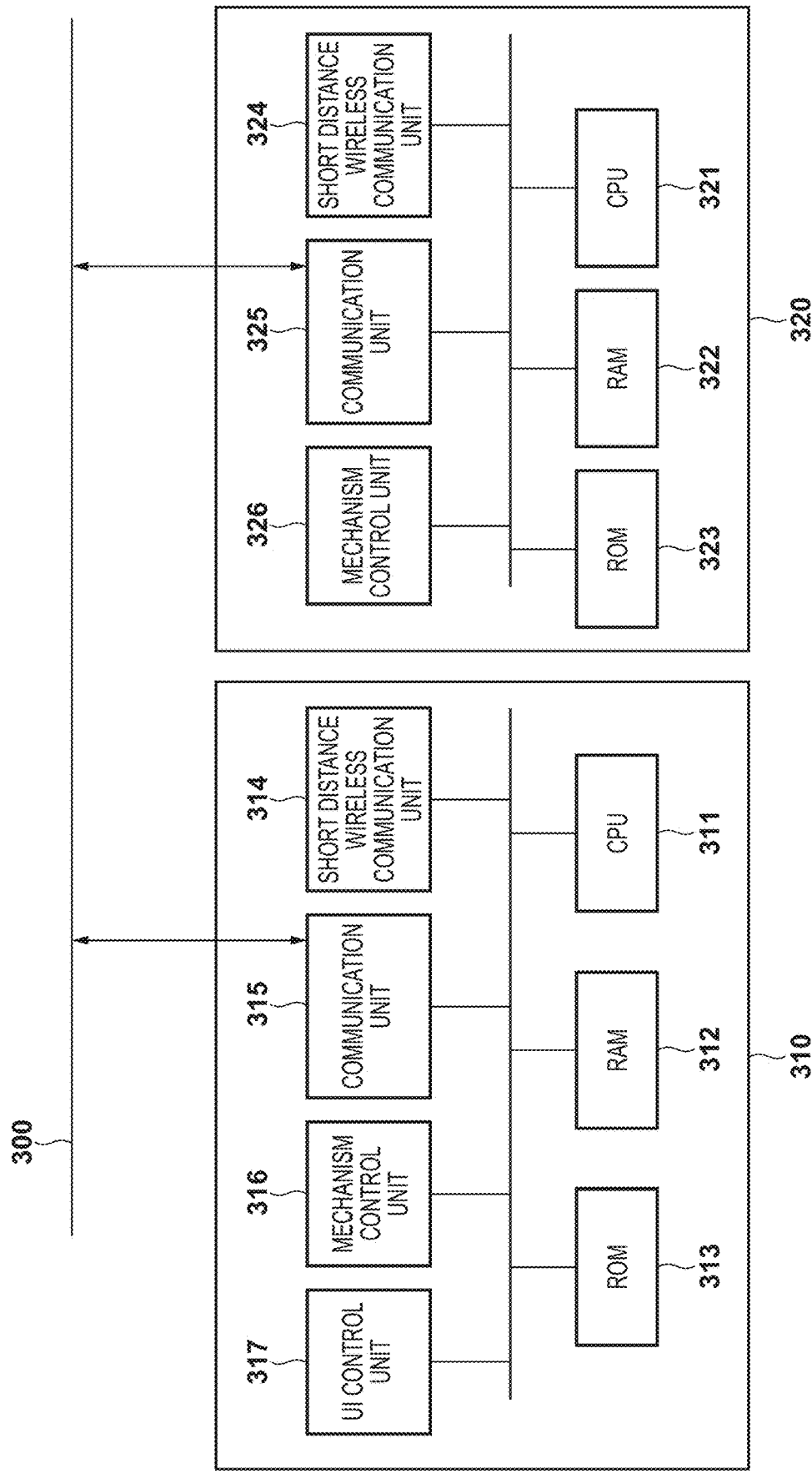
FIG. 3 is a block diagram showing the arrangement of a control unit.

Note that the subunit control unit 320 mounted in each unit is not limited to the arrangement shown in FIG. 3, and may appropriately include another block in accordance with the unit to mount. For example, the types and number of sensors to be controlled by the mechanism control unit 326 may be different between the consumable liquid unit 105 and the ink tank unit 106. Additionally, for example, in the DFE 102, a mass storage device configured to accumulate image data may be formed.

In this embodiment, on the subunit control unit 320 that controls the ink tank unit 106, Bluetooth5.1 is used as the communication method of the short distance wireless communication unit 324. Note that Bluetooth5.1 includes both the Classic Bluetooth standard and the Bluetooth Low Energy (BLE) standard. In this embodiment, BLE is used. In the BLE standard of Bluetooth5.1, the transmission method of a radio wave from each of a plurality of antennas is controlled. With this arrangement, a communication unit on a scanner side can calculate the direction of a communication unit on an advertiser side and the distance between them.

<Ink Tank Structure>

Figure 4:
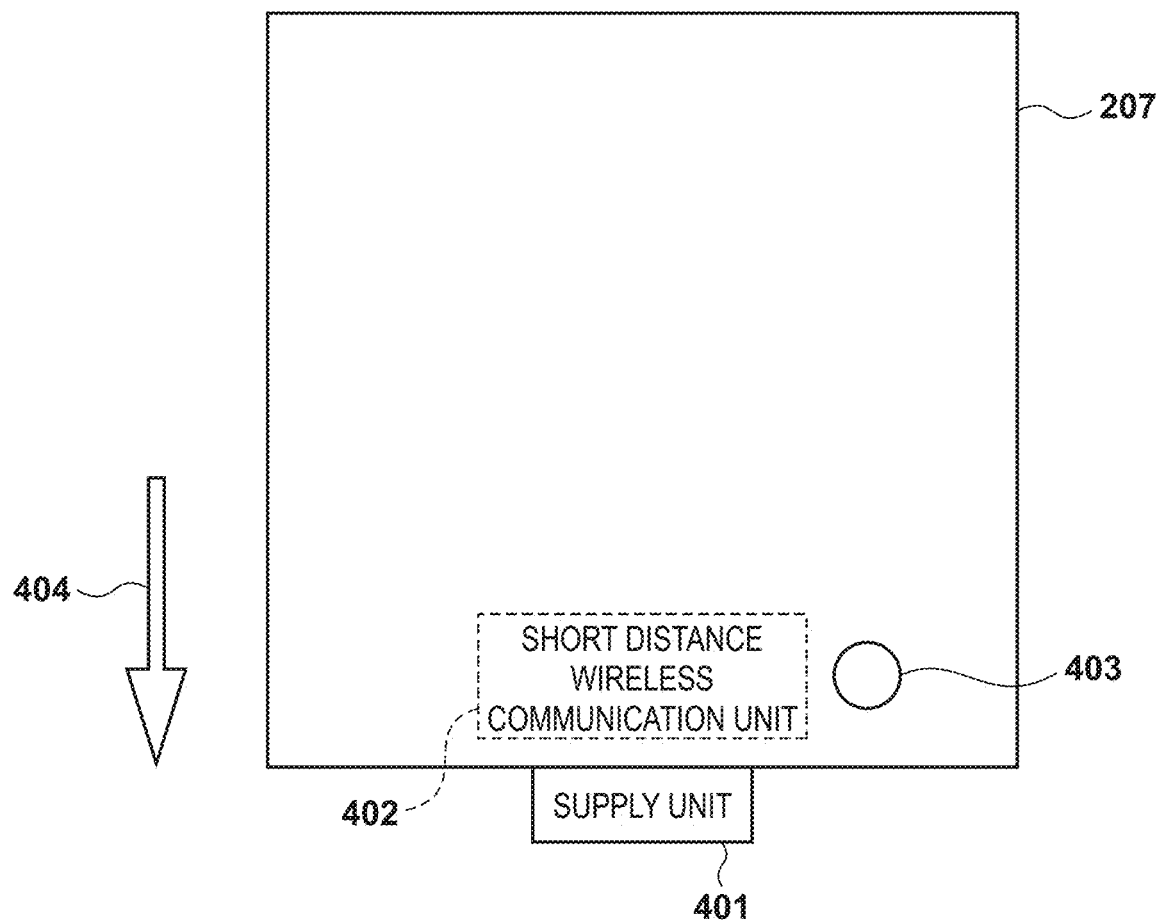
FIG. 4 is a view showing an ink tank viewed from above.

FIG. 4 is a view showing the ink tank 207 viewed from above. An ink supply unit 401, a short distance wireless communication unit 402, and an LED 403 are arranged on the upper portion of the ink tank 207. An arrow 404 in FIG. 4 indicates the front direction of the ink tank 207 when installed in the ink tank unit 106 shown in FIG. 1. When the ink tank 207 is installed in the ink tank unit 106, the ink supply unit 401 can supply ink from the ink tank 207 to the ink tank unit 106. The short distance wireless communication unit 402 is a unit configured to perform short distance wireless communication, and can communicate with the short distance wireless communication unit of a communication partner located within a predetermined range. The arrangement of the short distance wireless communication unit 402 is not limited to the arrangement shown in FIG. 4, and the short distance wireless communication unit 402 may be arranged at the tank center in, for example, the direction of the arrow 404 depending on the device arrangement. The LED 403 can be turned on/off in accordance with information acquired by the short distance wireless communication unit 402. Note that in this embodiment, the LED 403 is only one LED of red. However, a plurality of LEDs may be installed, an LED other than red may be used, or control other than turning on/off, for example, blinking may be performed.

<Positional Relationship Between Ink Tank Unit and Ink Tank>

Figure 14:
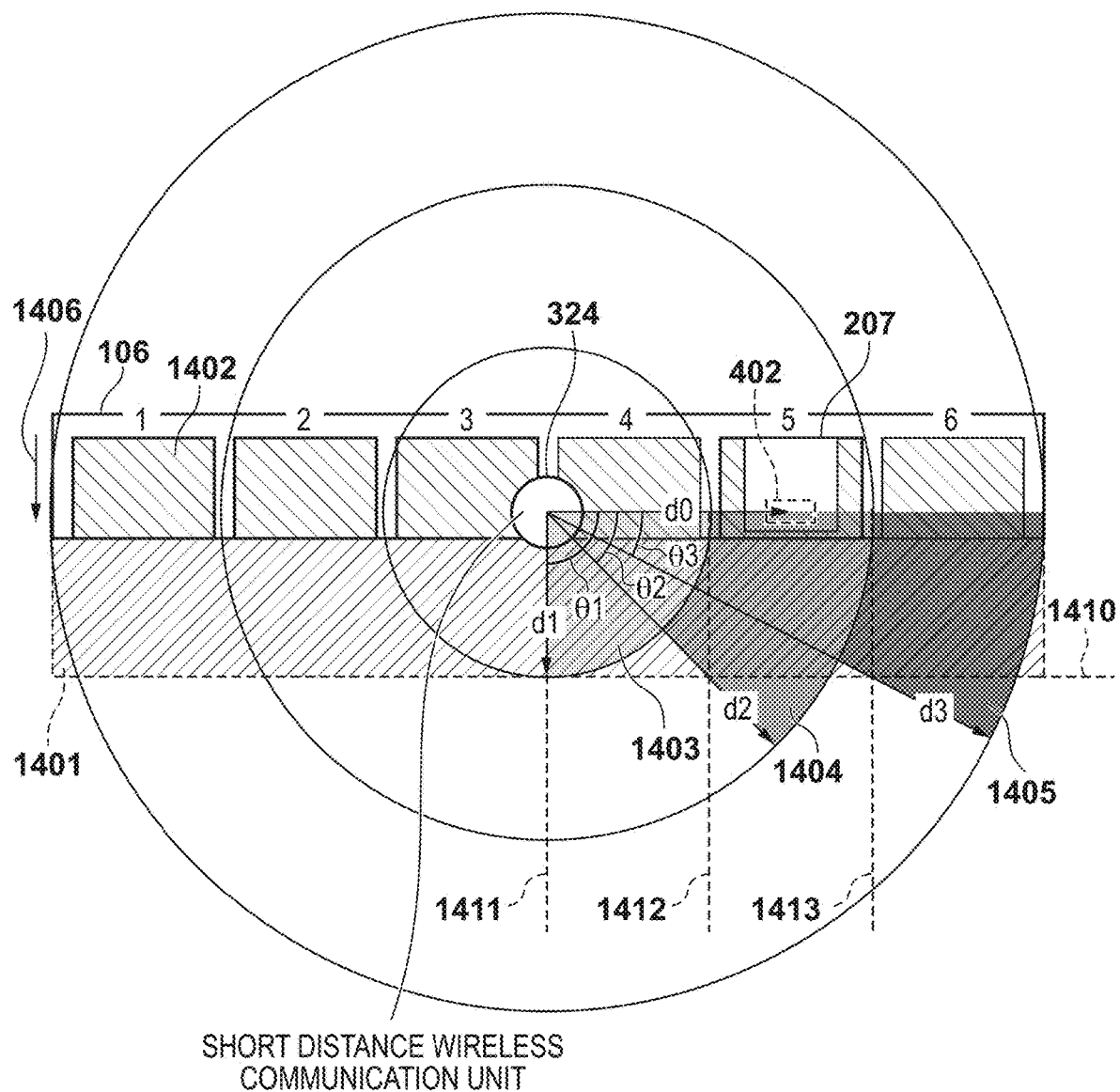
FIG. 14 is a view showing an ink tank unit viewed from above.

FIG. 14 is a view showing the ink tank unit 106 viewed from above, and shows the positional relationship between the ink tank unit 106 and one installed ink tank 207. An arrow 1406 in FIG. 14 indicates the front direction of the ink tank unit 106. In FIGS. 14, 1 to 6 represent the rack numbers of installation racks for the ink tanks 207. FIG. 14 shows a state in which the ink tank 207 is installed in the installation rack of rack number 5. Note that the ink tank unit can include one or a plurality of racks.

The short distance wireless communication unit 324 of the ink tank unit 106 is arranged at the center and on the front side in a widthwise direction orthogonal to the arrow 1406. The short distance wireless communication unit 324 is arranged at such a position that when installation of the ink tank 207 on the installation rack is completed, the short distance wireless communication unit 324 and the short distance wireless communication unit 402 of the ink tank 207 linearly line up in the widthwise direction. Note that the arrangement of the short distance wireless communication unit 324 is not limited to the position at the center and on the front side shown in FIG. 14, and any other position near the center in the widthwise direction of the ink tank unit 106 is possible. For example, the short distance wireless communication unit 324 may be arranged not on the front side but at the center of the ink tank unit 106 in the direction of the arrow 1406.

A reference exchange area 1401 is a reference exchange area for the ink tank unit 106. In this embodiment, the reference exchange area 1401 is an area used to define an exchange area as the target area of position information detection of the ink tank 207, and is not used to perform position information detection of the ink tank 207. A rack area 1402 represents an area corresponding to each rack number. An exchange area 1403 represents an exchange area of rack number 4, an exchange area 1404 represents an exchange area of rack number 5, and an exchange area 1405 represents an exchange area of rack number 6.

A distance d0 represents a distance from the short distance wireless communication unit 324 to the short distance wireless communication unit 402 of the ink tank 207. A distance d1 is a distance from the short distance wireless communication unit 324 until the installation racks of rack numbers 3 and 4 are included. A distance d2 is a distance from the short distance wireless communication unit 324 until the installation racks of rack numbers 2 and 5 are included. A distance d3 is a distance from the short distance wireless communication unit 324 until the installation racks of rack numbers 1 and 6 are included.

θ1 to θ3 represent angle information from the side of installation racks 4 to 6 in installation racks 1 to 6 when the widthwise direction is defined as 0°. In FIG. 14, for example, an angle made by a line including the distance d0 and a line including the distance d1 is indicated by θ1, an angle made by the line including the distance d0 and a line including the distance d2 is indicated by θ2, and an angle made by the line including the distance d0 and a line including the distance d3 is indicated by θ3. The angle θ1 is an angle obtained by rotating the line including the distance d0 until it passes through the intersection between a line 1410 parallel to the widthwise direction of the ink tank unit 106 and a perpendicular line 1411 from the ink tank unit 106. Note that the exchange area 1403 is a sector area of the angle θ1, which has the distance d1 as the radius.

The angle θ2 is an angle obtained by rotating the line including the distance d0 until it passes through the intersection between the line 1410 and a perpendicular line 1412 from the ink tank unit 106. Note that the exchange area 1404 is an area formed by removing an area of the angle θ2 of the exchange area 1403 from a sector area of the angle θ2, which has the distance d2 as the radius.

The angle θ3 is an angle obtained by rotating the line including the distance d0 until it passes through the intersection between the line 1410 and a perpendicular line 1413 from the ink tank unit 106. Note that the exchange area 1405 is an area formed by removing an area of the angle θ3 of the exchange area 1404 and an area of the angle θ3 of the exchange area 1403 from a sector area of the angle θ3, which has the distance d3 as the radius.

That is, the range of the angle from 0° to θ1 and the distance from 0 to d1 is the exchange area 1403 corresponding to the installation rack of rack number 4. In addition, the range of the angle from 0° to θ2 and the distance from d1 to d2 is the exchange area 1404 corresponding to the installation rack of rack number 5. Also, the range of the angle from 0° to θ3 and the distance from d2 to d3 is the exchange area 1405 corresponding to the installation rack of rack number 6.

FIG. 14 shows, as one example, the exchange areas 1403 to 1405 of the installation racks of rack numbers 4 to 6. However, the exchange areas of the installation racks of rack numbers 1 to 3 are also defined in a similar manner. For example, the angle information is defined within the range of 90° to 180°. In this embodiment, the position of the ink tank 207 is detected using the rack area 1402 and the exchange areas 1403 to 1405, and it is determined whether the ink tank 207 is inserted into an appropriate installation rack of the ink tank unit 106.

Note that the exchange area in this embodiment is not limited to the shape shown in FIG. 14. For example, a rectangular area that is a part of the reference exchange area 1401 may be used. In this embodiment, the exchange areas are defined on an installation rack basis not to overlap each other, like the exchange areas 1403 to 1405. However, the exchange areas may partially overlap. In addition, position information may be detected stepwise using exchange areas adjacent to each other. For example, if the ink tank is located in an exchange area adjacent to a correct exchange area, the user may be notified that the ink tank is located in the adjacent exchange area. If the ink tank is located in an exchange area that is neither the correct exchange area nor the adjacent exchange area, the user may be notified of an insertion error.

<Various Kinds of Information of Ink Tank and Ink Tank Unit>

In this embodiment, the ROM 323 of the subunit control unit 320 of the ink tank unit 106 stores an "ink tank reception list" that stores information received from the ink tank 207 when the ink tank unit 106 has detected the ink tank 207. The information received from the ink tank 207 is stored in the ink tank reception list as attribute information for each ink tank. Note that an example of the ink tank reception list is shown in FIG. 23.

The ink tank reception list includes a supply flag 1102 shown in FIG. 11, which represents whether ink has already been supplied from the ink tank 207 to the ink tank unit 106 after the ink tank 207 is installed in the ink tank unit 106. For example, the supply flag 1102 is information representing "1" if ink supply has already been done, and "0" if ink supply has not been done yet. In addition to the supply flag 1102, the ink tank reception list also stores the color of the ink tank 207 and the position information (distance information and angle information) of the ink tank 207 as shown in FIG. 23. The ink tank reception list may also store other information. For example, the serial number, the lot number, or the like of the ink tank 207 may be stored.

The ROM 323 of the subunit control unit 320 of the ink tank unit 106 also stores a "rack-specific list" that stores the information of each installation rack of the ink tank unit 106. Note that an example of the rack-specific list is shown in FIG. 24. The rack-specific list stores information such as an ink tank state 1103 representing the state of an ink tank installed in an installation rack, a supply state 1104, and an ink tank exchange possibility 1105. As the ink tank state 1103, one of "uninstalled state", "exchange state", and "installed state" is stored. "Uninstalled state" represents a state in which the ink tank 207 is not installed in a correct (the color of the ink tank and that of the installation rack match) installation rack, and "installed state" is information representing that the ink tank 207 is installed in a correct installation rack. "Exchange state" represents that the ink tank 207 is located in the exchange area of the correct installation rack. Hence, if the ink tank 207 is installed in a correct installation rack via a correct exchange area, the state transitions from "exchange state" to "installed state".

The supply state 1104 shows one of "supply waiting state", "supplying state", and "supplied state" for the ink tank 207 installed in the installation rack. These pieces of information sequentially transition when ink supply from the ink tank 207 is performed, and details will be described later with reference to FIG. 13.

The ink tank exchange possibility 1105 shows one of "possible", "detachment impossible", and "insertion error" for the ink tank 207 installed in the installation rack. "Possible" represents a state in which the ink tank 207 can be exchanged. "Detachment impossible" represents a state in which the ink tank 207 cannot be detached because of an ink supply operation. "Insertion error" represents a state in which the ink tank 207 to be installed is inserted into a wrong installation rack. Note that "possible" is set as a default value.

In addition to the ink tank state 1103, the supply state 1104, and the ink tank exchange possibility 1105, the rack-specific list stores a rack number representing the position of each installation rack, the angle information and the distance information of each rack area, the angle information and the distance information of each exchange area, and installable ink colors, as shown in FIG. 24. Furthermore, after the operator executes an exchange operation, a history such as an exchange date/time may be stored. In this embodiment, using the information of the ink tank reception list and the rack-specific list, it is determined whether, for example, the ink tank 207 exists in a correct exchange area. The ink tank reception list and the rack-specific list may be stored in the ROM 313 of the main unit control unit 310 of the main unit 101.

Figure 9:
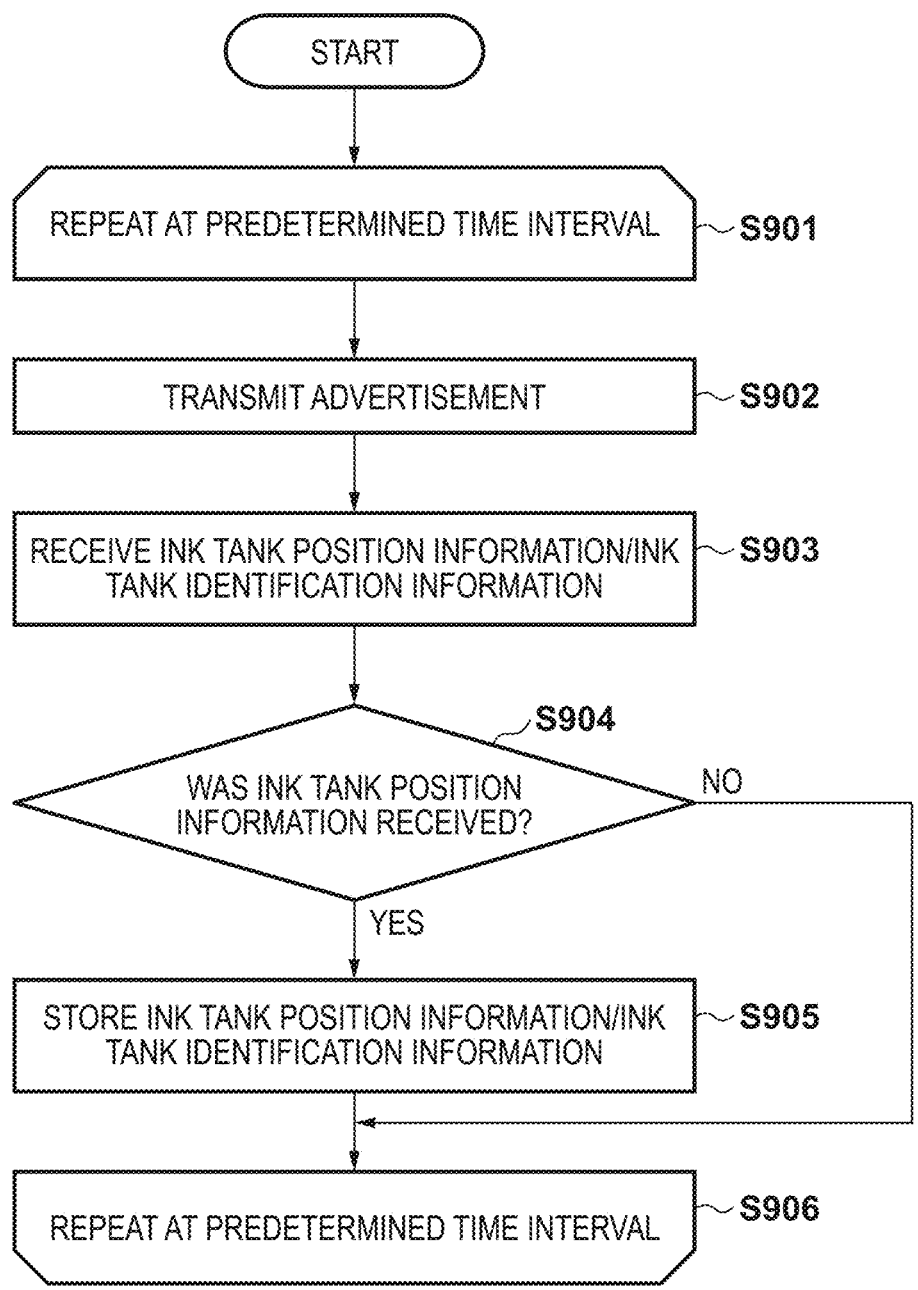
FIG. 9 is a flowchart showing processing of the ink tank unit.

In addition, the information in the ink tank reception list can be erased if a predetermined condition is satisfied. For example, after the ink tank 207 is temporarily detected, if processing shown in, for example, FIG. 9 is repetitively executed, and the ink tank 207 is not detected, it is judged that the ink tank 207 is separated from the ink tank unit 106. Then, the ink tank unit 106 erases the information of the corresponding ink tank 207 in the ink tank reception list. The information may be erased in accordance with the information in the rack-specific list. For example, the information may be erased when "uninstalled state" of the ink tank information in the rack-specific list has continued for a predetermined time.

FIG. 11 is a view showing the combinations of information in the ink tank reception list and the rack-specific list. A state number 1100 in FIG. 11 represents a number corresponding to each combination. An ink tank reception state 1101 is information representing whether the information of a detected ink tank exists in the ink tank reception list when the ink tank unit 106 has detected the ink tank 207 by the processing shown in FIG. 9. When the operator installs the ink tank 207 in an installation rack of the ink tank unit 106, the states of the combinations shown in FIG. 11 can occur.

The detection operation of the ink tank 207 according to this embodiment will be described below.

FIG. 5 is a view showing an example of the structure of advertisement information broadcast by the short distance wireless communication unit 324 of the ink tank unit 106 to the periphery of the ink tank unit 106. When power supply is started, the short distance wireless communication unit 324 performs initialization processing and transitions to an advertising state. When transitioning to the advertising state, the short distance wireless communication unit 324 periodically broadcasts advertisement information to the periphery based on the advertisement interval. The advertisement information is a signal including basic header information (identification information for identifying the apparatus that transmits the advertisement information, and the like), and includes a header 501 and a payload 502. The ink tank 207 receives the advertisement information, thereby recognizing the presence of the ink tank unit 106.

Furthermore, by transmitting a BLE connection request to the ink tank unit 106, the ink tank 207 can be BLE-connected to the ink tank unit 106. The header 501 stores the type of advertisement information, the information of the size of the payload 502, and the like. The payload 502 stores information such as a device name 503 serving as identification information, mounted profile information, connection information 504 used to BLE-connect the ink tank unit 106, and transmission power (Tx Power) 505 of the advertisement information. Identification information 506 of the image forming apparatus (printing apparatus) may be included in the advertisement information.

In this embodiment, when the ink tank unit 106 is powered on, the short distance wireless communication unit 324 of the ink tank unit 106 transitions to the advertising state and starts transmitting advertisement information. The timing at which the short distance wireless communication unit 324 starts transmitting advertisement information is not limited to that described above. For example, a timing at which a predetermined operation for enabling the BLE function is also possible.

FIG. 6 is a view showing an example of the structure of advertisement information transmitted by the short distance wireless communication unit 324 in the ink tank unit 106. The ink tank 207 detects the distance between the ink tank 207 and the ink tank unit 106 using the information shown in FIG. 6. In addition, the ink tank 207 detects the direction of the ink tank unit 106 with respect to the ink tank 207 using the information shown in FIG. 6. A constant tone extension (CTE) 605 is data used to detect the direction of the ink tank unit 106 with respect to the ink tank 207. A preamble 601 is data for clock synchronization used when the ink tank 207 receives advertisement information of the ink tank unit 106. Access-address 602 is data for frame synchronization used when the ink tank 207 receives advertisement information of the ink tank unit 106. PDU 603 is an actual data portion in advertisement information transmitted by the ink tank unit 106. The header 501 and the payload 502 that are the advertisement information shown in FIG. 5 are included in the PDU 603. CRC 604 is the error detection code value of the PDU 603 at the time of communication.

Figure 7:
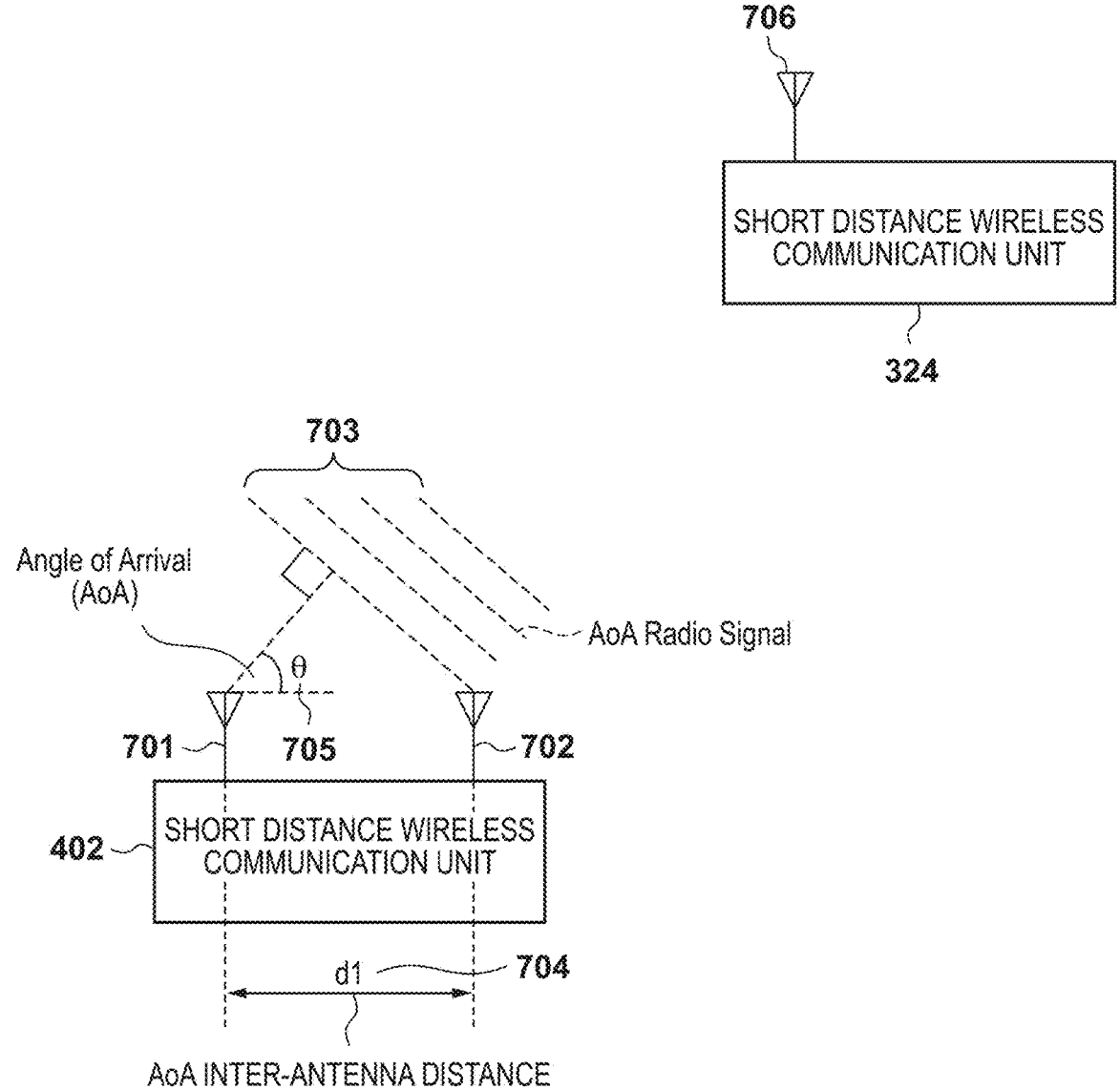
FIG. 7 is a view for explaining an arrangement for detecting the direction of an ink tank unit.
Figure 8:
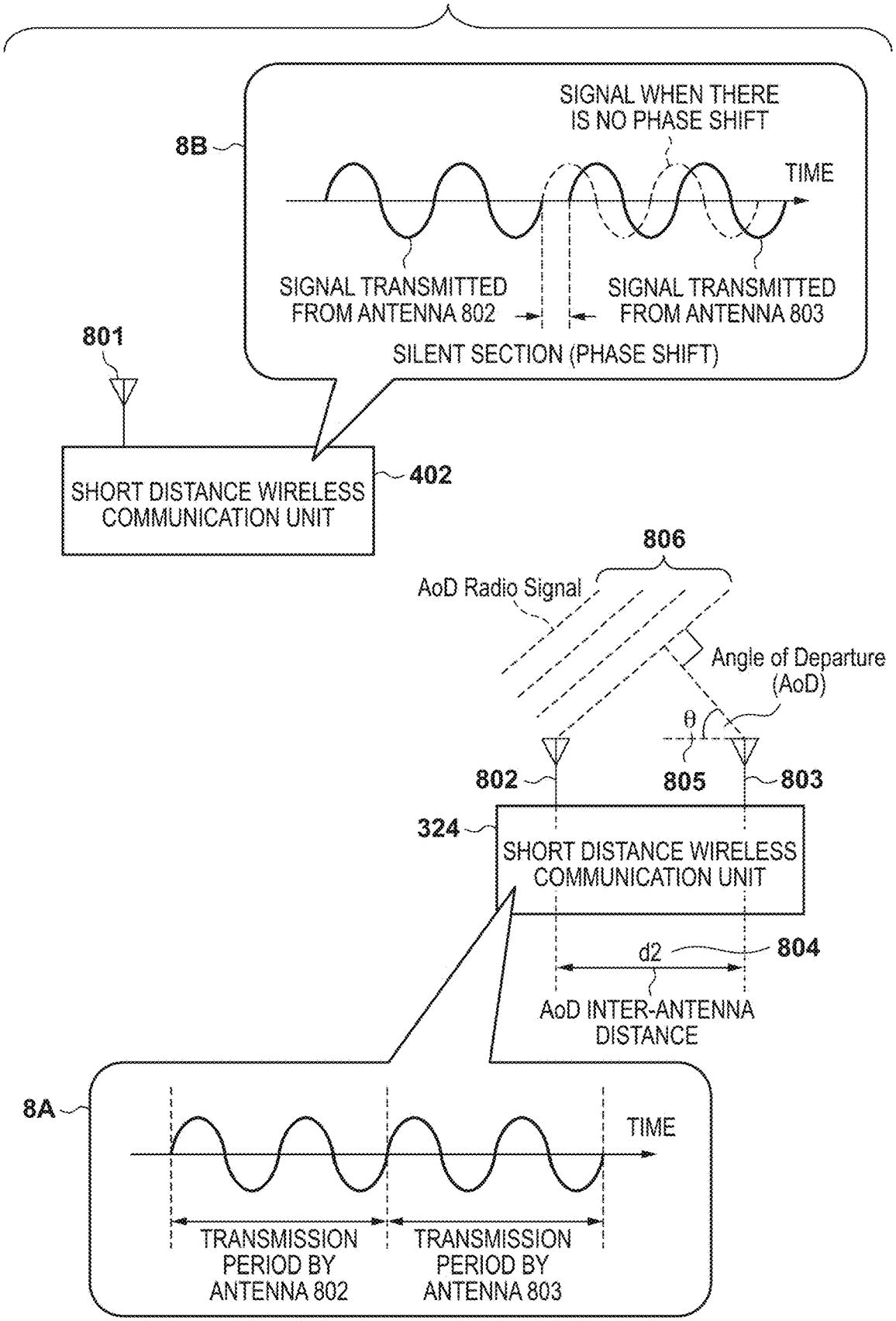
FIG. 8 is a view for explaining an arrangement for detecting the direction of the ink tank unit.

FIGS. 7 and 8 are views for explaining the function of the ink tank 207 to detect the distance to the ink tank unit 106 and the direction in which the ink tank unit 106 is located. In this detection processing, advertisement information transmitted by the short distance wireless communication unit 324 in the ink tank unit 106 is used. Note that a description will be made with reference to FIGS. 7 and 8 using two antennas as an example. However, the present invention is not limited to this. For example, three or more antennas may be arranged not on a straight line but on a plane so that at least directions in 360° on a two-dimensional area can be detected.

The methods of the short distance wireless communication unit 402 of the ink tank 207 to estimate the direction of the short distance wireless communication unit 324 in the ink tank unit 106 are, for example, the following two methods. The first method is (1) a method implemented when the short distance wireless communication unit 402 (receiving side) includes a plurality of antennas. The second method is (2) a method implemented when the short distance wireless communication unit 324 includes a plurality of antennas.

The method (1) of these methods will be described with reference to FIG. 7. In the arrangement shown in FIG. 7, using a plurality of antennas of the short distance wireless communication unit 402 that is the receiving-side apparatus, the short distance wireless communication unit 402 estimates the angle of arrival of a received radio wave based on the phase difference between radio waves when arrived at the antennas. The angle of arrival will sometimes be referred to as an AoA hereinafter.

In FIG. 7, the short distance wireless communication unit 324 transmits advertisement information by a radio frame (AoA Radio Signal 703) including the CTE 605 using an antenna 706. The short distance wireless communication unit 402 receives the radio frame by a plurality of antennas (both an antenna 701 and an antenna 702). At this time, an inter-antenna distance 704 between the antenna 701 and the antenna 702 is d1, and an AoA 705 is θ. In this case, the radio wave to be received by the antenna 701 is received in a distance longer by $d1 \times \cos(\theta)$ than the radio wave received by the antenna 702. For this reason, letting λ be the wavelength of the radio wave, the phase of the radio wave received by the antenna 701 delays, as compared to the phase of the radio wave received by the antenna 702, by $$\phi 1=2\pi\times(d1\times\cos(\theta)/\lambda) \quad (1)$$

wherein ϕ1 is the difference between the phase of the radio wave received by the antenna 702 and the phase of the radio wave received by the antenna 701. From equation (1), the AoA 705 can be calculated by $$\theta=\arccos(\phi 1\times\lambda)/(2\pi\times d1)) \quad (2)$$

Hence, the ink tank 207 can estimate the direction of the short distance wireless communication unit 324 of the ink tank unit 106 by calculating equation (2).

The method (2) of the above-described methods will be described next with reference to FIG. 8. In the arrangement shown in FIG. 8, advertisement information is transmitted from the plurality of antennas of the short distance wireless communication unit 324 that is the transmitting-side apparatus by a radio frame (AoD Radio Signal (AoD signal) 806) including the CTE 605 in different periods. For example, as shown in an arrangement 8A of FIG. 8, the transmission period of the AoD radio signal 806 by an antenna 802 is set, and immediately after that, the transmission period of the AoD radio signal 806 by an antenna 803 is set. In this case, in the short distance wireless communication unit 324, no silent section is generated between the transmission of the AoD radio signal 806 by the antenna 802 and the transmission of the AoD radio signal 806 by the antenna 803. On the other hand, the short distance wireless communication unit 402 can receive these radio signals in a form as shown in the arrangement 8B of FIG. 8. That is, since the signal transmitted from the antenna 803 arrives at the short distance wireless communication unit 402 with a delay via a path longer than that of the signal transmitted from the antenna 802, a silent section is generated between the signals. In addition, if the antenna 803 transmits the signal first, the signal transmitted from the antenna 802 arrives at the short distance wireless communication unit 402 before the signal transmitted from the antenna 803 wholly arrives at the short distance wireless communication unit 402. If a silent section of a predetermined length is set after completion of the signal transmission period of the antenna 802, and the signal transmission period from the antenna 803 is then set, the silent section is observed longer than the predetermined length in the radio signal received by the short distance wireless communication unit 402. Similarly, if a silent section of a predetermined length is set after completion of the signal transmission period of the antenna 803, and the signal transmission period from the antenna 802 is then set, the silent section is observed shorter than the predetermined length in the radio signal received by the short distance wireless communication unit 402. In this way, the signals transmitted from the plurality of antennas are observed as the shift of timing according to the path lengths in the short distance wireless communication unit 402. Note that to observe the shift of timing, the short distance wireless communication unit 402 is notified, in advance, of scheduling information representing which antenna transmits a signal at which timing (by, for example, the short distance wireless communication unit 324 or another apparatus).

Note that the shift of reception timing corresponds to the shift of the phase of the received signal. For example, in the example shown in FIG. 8, the signal transmitted from the antenna 803 arrives at the short distance wireless communication unit 402 in a path longer by d2×cos(ϕ) than the signal transmitted from the antenna 802. Here, d2 is an inter-antenna distance 804 between the antenna 802 and the antenna 803. Because of the path length difference, letting c be the propagation speed of light, a reception timing shift of d2×cos(ϕ)/c sec occurs. Simultaneously, a phase difference represented by $$\phi 2=2\pi\times d2\times\cos(\phi)/\lambda \quad (3)$$

is generated. Note that λ is the wavelength of the radio wave, as described above. In addition, ϕ is the angle made by a straight line that connects the short distance wireless communication unit 324 and the short distance wireless communication unit 402 and a straight line that connects the antenna 802 and the antenna 803. Note that the angle is called an angle of departure, and will be referred to as an AoD 805 hereinafter. The short distance wireless communication unit 402 can specify the phase difference ϕ2 by performing correlation detection using, as a reference, for example, the signal received first in a plurality of signals transmitted from the short distance wireless communication unit 324. From equation (3), the short distance wireless communication unit 402 can calculate, using the phase difference ϕ2, the AoD 805 as $$\phi=\arccos((\phi 2\times\lambda)/(2\pi\times d2)) \quad (4)$$

Note that the short distance wireless communication unit 402 acquires the information of the inter-antenna distance d2 in advance from the short distance wireless communication unit 324 or another apparatus. The short distance wireless communication unit 402 calculates the AoD 805 as indicated by equation (4), thereby specifying the direction of the short distance wireless communication unit 402 viewed from the short distance wireless communication unit 324. In addition, the short distance wireless communication unit 402 can estimate the direction of arrival of the radio wave based on the AoD 805 by knowing how the antenna 802 and the antenna 803 are arranged. That is, if the antenna 802 is arranged on the west side of the antenna 803, and the AoD 805 is estimated as 45°, the short distance wireless communication unit 402 can estimate that the radio wave has arrived from the south east direction. Furthermore, the short distance wireless communication unit 402 can estimate the distance from the short distance wireless communication unit 324 based on the reception strength of the radio wave and the transmission power of the radio wave. The positional relationship with the short distance wireless communication unit 324 can thus be recognized. That is, the ink tank 207 can recognize the distance between the ink tank 207 and the ink tank unit 106 and the direction of the ink tank unit 106 with respect to the ink tank 207. In addition, the short distance wireless communication unit 402 can accurately estimate the position of the self-apparatus by acquiring the information of the position at which the short distance wireless communication unit 324 is arranged.

Note that concerning the short distance wireless communication unit 324 and the short distance wireless communication unit 402 each including a plurality of antennas, the number of antennas used as the plurality of antennas is not limited to that described above. For example, in FIG. 8, three or more antennas that are not arranged on a straight line may be used, and the AoD 805 may be acquired by calculating the average of angles of departure θ obtained from the antennas. An embodiment in which one of the short distance wireless communication unit 324 and the short distance wireless communication unit 402 uses a plurality of antennas has been described above. However, the present invention is not limited to this. Both the short distance wireless communication unit 324 and the short distance wireless communication unit 402 may use a plurality of antennas.

FIG. 9 is a flowchart showing processing of the ink tank unit 106 when detecting the angle and distance of the direction in which the ink tank 207 viewed from the ink tank unit 106 is located. The processing shown in FIG. 9 is implemented when, for example, the CPU 321 loads a program stored in the ROM 323 and executes it. The processing shown in FIG. 9 is activated when the ink tank unit 106 is powered on, and executed as background processing. Note that the processing shown in FIG. 9 is repetitively executed from step S901 to step S906 at a predetermined time interval.

In step S902, the CPU 321 controls the short distance wireless communication unit 324 to cause it to broadcast advertisement information. At this time, radio wave transmission using a plurality of antennas as shown in FIG. 8 is performed such that the ink tank 207 that has received the advertisement information can acquire angle information.

In step S903, the CPU 321 receives ink tank position information and ink tank identification information transmitted from the ink tank 207. The ink tank position information includes angle information and distance information, which the ink tank 207 has detected by receiving the advertisement information. The ink tank identification information includes the color information of ink and an ink supply flag. Note that if the ink tank 207 is new, the ink supply flag is "0". The reception of the ink tank position information is done using BLE as a communication method. However, the communication method is not limited to this. Another communication method, for example, NFC may be used to receive the ink tank position information.

In step S904, the CPU 321 determines whether the ink tank position information has normally been received from the ink tank 207. Upon determining in step S904 that the ink tank position information has normally been received, the processing in FIG. 9 advances to step S905. The CPU 321 stores, in the ink tank reception list in the ROM 323, the angle information and the distance information included in the ink tank position information, and the ink color and the ink supply flag included in the ink tank identification information. If there exist a plurality of detected ink tanks 207, the CPU 321 stores the ink tank position information and the ink tank identification information for each ink tank 207. Note that the angle information is set to 0° when, for example, the ink tank 207 exists on the line on the right side of d0 in FIG. 14, and takes a value in a positive direction clockwise and a value in a negative direction counterclockwise. The angle information takes a value from −180° to +180°. For example, if the ink tank 207 is located at a position from the distance d3 to d2 and within the range of 0° to 30° (that is, θ3), the ink tank 207 exists in the exchange area 1405 to be described later.

If it is determined in step S904 that the ink tank position information has not normally been received, step S905 is not executed, and the processing from step S902 is repeated after a predetermined time.

Figure 10:
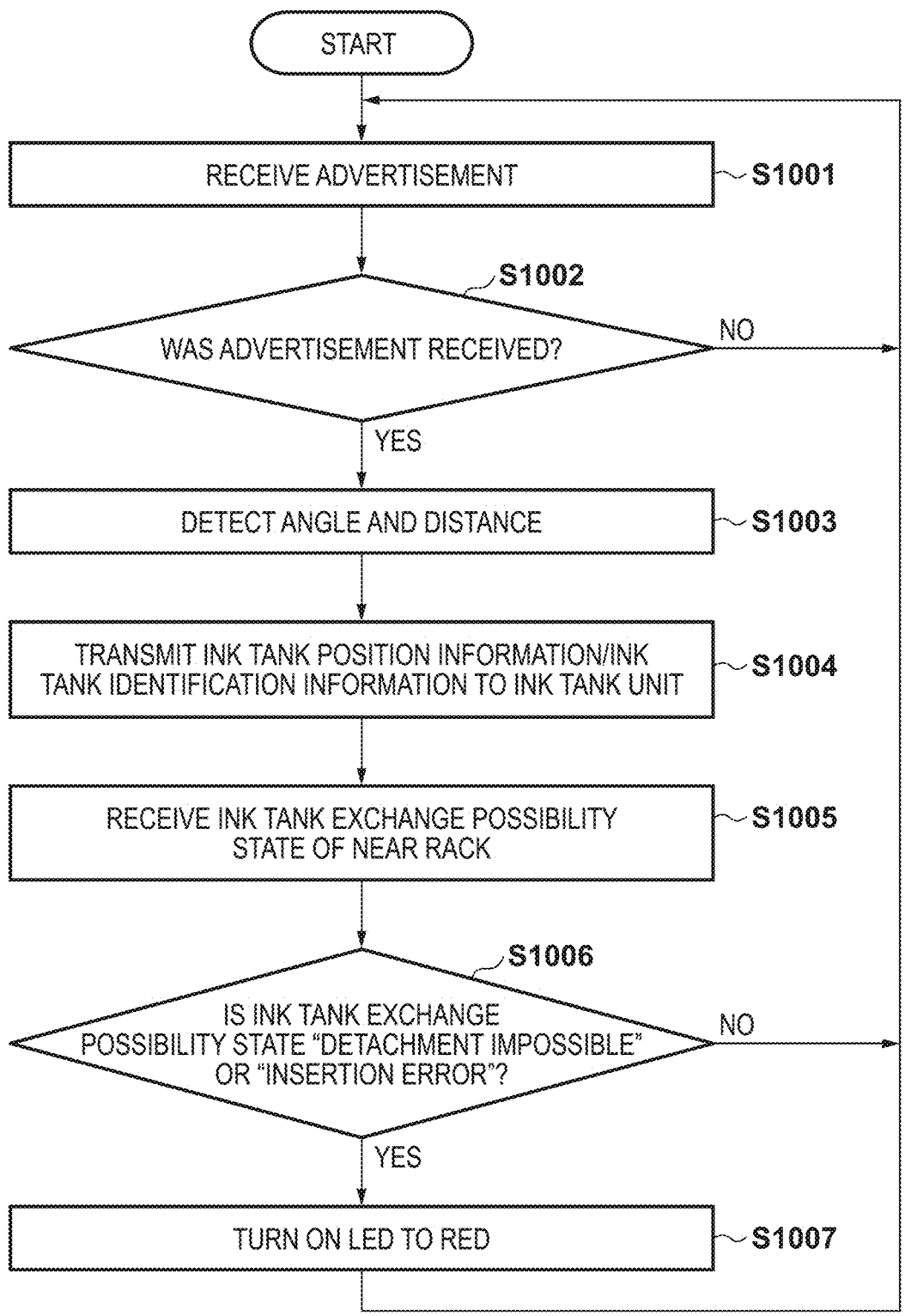
FIG. 10 is a flowchart showing processing of an ink tank.

FIG. 10 is a flowchart showing processing of the short distance wireless communication unit 402 of the ink tank 207. In step S1001, the short distance wireless communication unit 402 receives the radio wave of advertisement information transmitted from the short distance wireless communication unit 324 of the ink tank unit 106.

In step S1002, the short distance wireless communication unit 402 determines whether the radio wave of advertisement information has normally been received. Upon determining that the radio wave of advertisement information has normally been received, the process advances to step S1003, and the short distance wireless communication unit 402 analyzes the advertisement information and detects the angle and distance of the direction in which the ink tank 207 viewed from the ink tank unit 106 is located. Here, the angle and distance of the direction in which the ink tank unit 106 viewed from the ink tank 207 is located may be detected, and the angle and distance of the direction in which the ink tank 207 viewed from the ink tank unit 106 is located may be detected from the detection result.

In step S1004, the short distance wireless communication unit 402 transmits ink tank position information including the angle information and the distance information detected in step S1003, and ink tank identification information to the ink tank unit 106. Note that the ink tank performs the process of step S1004 using GATT communication or the like. In step S1005, the short distance wireless communication unit 402 receives, from the ink tank unit 106, the ink tank exchange possibility 1105 of an installation rack near the ink tank 207. Reception of the ink tank exchange possibility 1105 will be described later with reference to FIGS. 12 and 13.

In step S1006, the short distance wireless communication unit 402 determines, based on the ink tank exchange possibility 1105 received in step S1005, whether the ink tank exchange possibility 1105 is one of "detachment impossible" and "insertion error". Upon determining that the ink tank exchange possibility 1105 is neither "detachment impossible" nor "insertion error", that is, the ink tank exchange possibility 1105 is "possible", the processing from step S1001 is repeated. On the other hand, upon determining that the ink tank exchange possibility 1105 is one of "detachment impossible" and "insertion error", the process advances to step S1007, and the short distance wireless communication unit 402 performs light emission processing using the LED 403, and after that, repeats the processing from step S1001. Note that the short distance wireless communication unit 402 performs different light emission processes in "detachment impossible" and "insertion error". For example, if it is determined that the ink tank exchange possibility 1105 is "detachment impossible", the LED 403 is caused to emit light. If it is determined that the ink tank exchange possibility 1105 is "insertion error", the LED 403 is blinked.

With the above-described arrangement, the operator can confirm exchange possibility on the periphery of the ink tank unit 106, where an ink tank exchange operation is performed, without going to the touch panel display 109 to confirm the insertion state of the ink tank.

Figure 12:
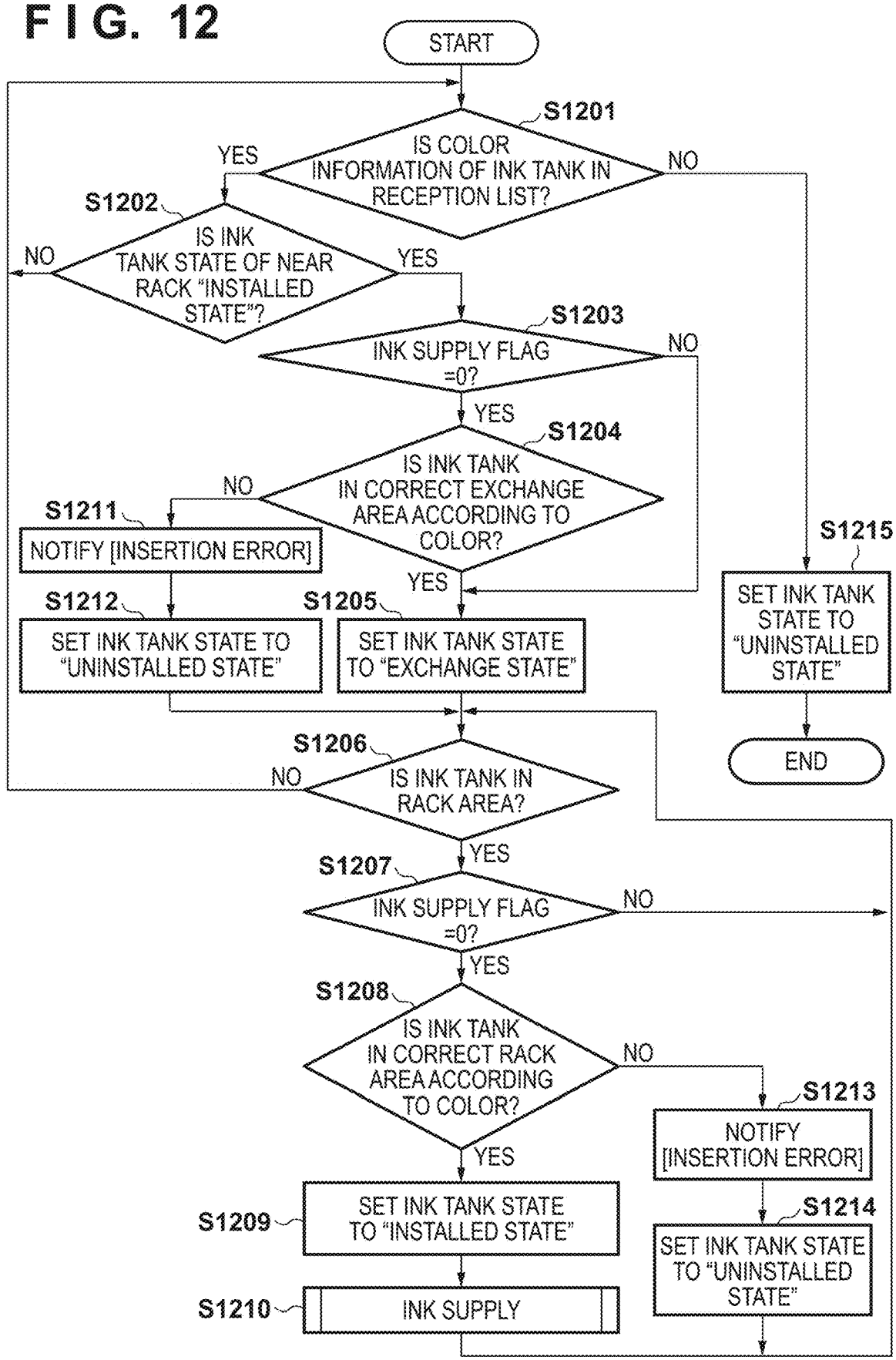
FIG. 12 is a flowchart showing processing of ink tank exchange.

FIG. 12 is a flowchart showing processing of ink tank exchange, which is executed by the ink tank unit 106. The processing shown in FIG. 12 is implemented when, for example, the CPU 321 loads a program stored in the ROM 323 and executes it. The processing shown in FIG. 12 is started when ink tank position information and ink tank identification information are received from the ink tank 207 in FIG. 9. The processing shown in FIG. 12 includes two processes. The first process is processing in an exchange area in steps S1201 to S1205, S1210, S1211, S1212, and S1215, which is performed as the ink tank 207 approaches an installation rack. The second process is processing in a rack area in steps S1206 to S1210, S1213, and S1214.

First, processing in an exchange area is performed. In step S1201, the CPU 321 determines whether the color information of the ink tank received in step S903 exists in the ink tank reception list. Upon determining that the color information of the ink tank exists in the ink tank reception list, in step S1202, the CPU 321 determines whether the ink tank state of a rack near the ink tank is "installed state". More specifically, the CPU 321 determines which rack has the exchange area to which the position information of the tank corresponds. If YES in step S1202, the CPU 321 determines whether the supply flag 1102 in the ink tank reception list is "0" (step S1203). The supply flag 1102 that is "0" represents that ink is not supplied yet, and ink supply is to be executed for the ink tank from now on. That is, the ink tank with the supply flag 1102 of "0" is a new ink tank. Upon determining that the supply flag 1102 is "0", the process advances to step S1204. In step S1204, processing for determining whether the ink tank 207 is to be installed in a correct installation rack is performed. Note that if NO in step S1202, the processing shown in FIG. 12 returns to step S1201.

In step S1204, the CPU 321 determines whether the ink tank 207 exists in a correct exchange area. The CPU 321 determines, by collating, whether, for example, the distance information and angle information of the ink tank, which are stored in the ink tank reception list in step S905, fall within the ranges of distance information and angle information of the exchange area of the same color as the color information of the rack number in the information in the rack-specific list. For example, in FIG. 23, for a tank ID=1 in the ink tank reception list, M is stored as the color, distance d2−d1 is stored as the position information, and 150° is stored as the angle information. On the other hand, in FIG. 24, for rack number 2, M is set as the color, and a distance d2−d1 and an angle of 120° to 180° are set as the position information of the exchange area. That is, it is determined that the ink tank of tank ID=1 exists in a correct exchange area. Additionally, for example, in FIG. 23, for tank number=2 in the ink tank reception list, C is stored as the color, distance d2−d1 is stored as the position information, and 40° is stored as the angle information. On the other hand, in FIG. 24, for rack number 5, C is set as the color, and a distance d2−d1 and an angle of 0° to 60° are set as the position information of the exchange area. That is, it is determined that the ink tank of tank ID=2 exists in a correct exchange area. If it is determined that the ink tank exists in the correct exchange area, in step S1205, the CPU 321 sets "exchange state" to the rack number state in FIG. 24. At this time, an information combination shown by state number 3 in FIG. 11 is obtained.

On the other hand, if it is determined in step S1201 that information received from the ink tank 207 is not present any more, it is judged that the ink tank 207 has moved out of a detectable area. In this case, in step S1215, the CPU 321 sets "uninstalled state" to the ink tank state 1103, and ends the processing shown in FIG. 12. At this time, an information combination as shown by state number 1 to 8 in FIG. 11 is obtained. For example, the ink tank state of rack number 2 is set to "exchange state" by the above-described processing. Here, if the ink tank 207 corresponding to tank ID=1 moves out of the exchange area, the ink tank unit 106 cannot receive information from the ink tank 207. In this case, the CPU 321 determines NO in step S1201, and changes the ink tank state of the rack number corresponding to the color information of tank ID=1 to "uninstalled state". At this time, the CPU 321 deletes the information of tank ID=1 in the ink tank reception list.

In addition, if it is determined in step S1204 that the ink tank 207 does not exist in the correct exchange area, it is judged that the ink tank 207 has erroneously been inserted. In this case, the process advances to step S1211, and the CPU 321 sets the ink tank exchange possibility 1105 to "insertion error" and notifies the ink tank 207 of it. In step S1212, the CPU 321 sets the ink tank state 1103 to "unin-stalled state", and advances the process to step S1206. At this time, an information combination shown by state number 2 in FIG. 11 is obtained. For example, assume that pieces of information are stored as shown in FIG. 23 based on information received from the ink tank of tank ID=3. Here, the position information of the ink tank of tank ID=3 does not match the exchange area of the rack of Y with rack number 3. That is, the CPU 321 determines NO in step S1204. As a result, the CPU 321 sets "uninstalled state" to the ink tank state of rack number 3 in the rack-specific list and "insertion error" to the exchange possibility.

If it is determined in step S1203 that the supply flag 1102 is not "0", it is judged that ink supply has already been executed for the ink tank. In this case, the determination of step S1204 is not performed, and the ink tank state 1103 is set to "exchange state" in step S1205. In this case, an information combination shown by state number 7 in FIG. 11 is obtained. When the determination of step S1204 concerning whether the ink tank exists in the correct exchange area is not executed, for example, if the ink tank 207 passes through an exchange area when the operator detaches the tank in the supplied state, an ink tank insertion error notification is not made. It is therefore possible to prevent an unnecessary insertion error notification. Additionally, even if the ink tank 207 passes through an exchange area when the operator temporarily places the tank in the supplied state in an unoccupied installation rack, an ink tank insertion error notification is not made. It is therefore possible to prevent an unnecessary insertion error notification.

Next, processing in a rack area is performed. When the ink tank state 1103 changes to "exchange state" in step S1205, the CPU 321 determines in step S1206 whether the ink tank 207 exists in a rack area. For example, based on whether the angle information of the ink tank 207 is close to 0°, the CPU 321 determines whether the ink tank 207 exists in a rack area. If it is determined that the ink tank 207 does not exist in a rack area, the processing from step S1201 is repeated. On the other hand, if it is determined that the ink tank 207 exists in a rack area, the CPU 321 determines in step S1207 whether the supply flag in the ink tank reception list is "0". If it is determined that the supply flag is "0" (the combination of information as shown by state number 3 in FIG. 11), the ink tank 207 for which ink supply is to be executed from now on needs to be installed in a correct installation rack. Hence, in step S1208, the CPU 321 determines whether the ink tank 207 exists in a correct rack area. The CPU 321 determines, by collating, whether, for example, the distance information of the ink tank stored in the ink tank reception list in step S905 falls within the range of distance information of the rack area of the same ink color as the color information of the ink tank in the information in the rack-specific list.

Upon determining in step S1208 that the ink tank 207 exists in a correct rack area, in step S1209, the CPU 321 sets the ink tank state 1103 to "installed state". At this time, the combination of information as shown by state number 4 in FIG. 11 is obtained. In step S1210, the CPU 321 executes ink supply to be described later, and then repeats the processing from step S1206. For example, the information as shown in FIG. 23 is stored for tank ID=4 in the ink tank reception list shown in FIG. 23. Note that the angle information for tank ID=4 in FIG. 23 represents a state after the angle is changed from 20° when the ink tank exists in an exchange area to 0° representing a state in which the ink tank is placed in a rack. The color for tank ID=4 in the ink tank reception list is K, and the distance information is d3−d2. Referring to FIG. 24, the color of rack number 6 is K, and the distance information is d3–d2. That is, the CPU 321 determines YES in step S1208. The CPU 321 thus sets the ink tank state of rack number 6 to "installed state".

On the other hand, upon determining in step S1208 that the ink tank 207 does not exist in a correct rack area, in step S1213, the CPU 321 sets the ink tank exchange possibility 1105 to "insertion error", and notifies the ink tank 207 of it. In step S1214, the CPU 321 sets the ink tank state to "uninstalled state", and repeats the processing from step S1206. At this time, the combination of information as shown by state number 2 in FIG. 11 is obtained.

If it is determined in step S1207 that the ink supply flag is not "0", it is judged that ink supply has already been done for the ink tank. In this case, the determination of step S1208 is not executed, and the processing from step S1206 is repeated. At this time, the combination of information as shown by state number 7 in FIG. 11 is obtained.

Figure 13:
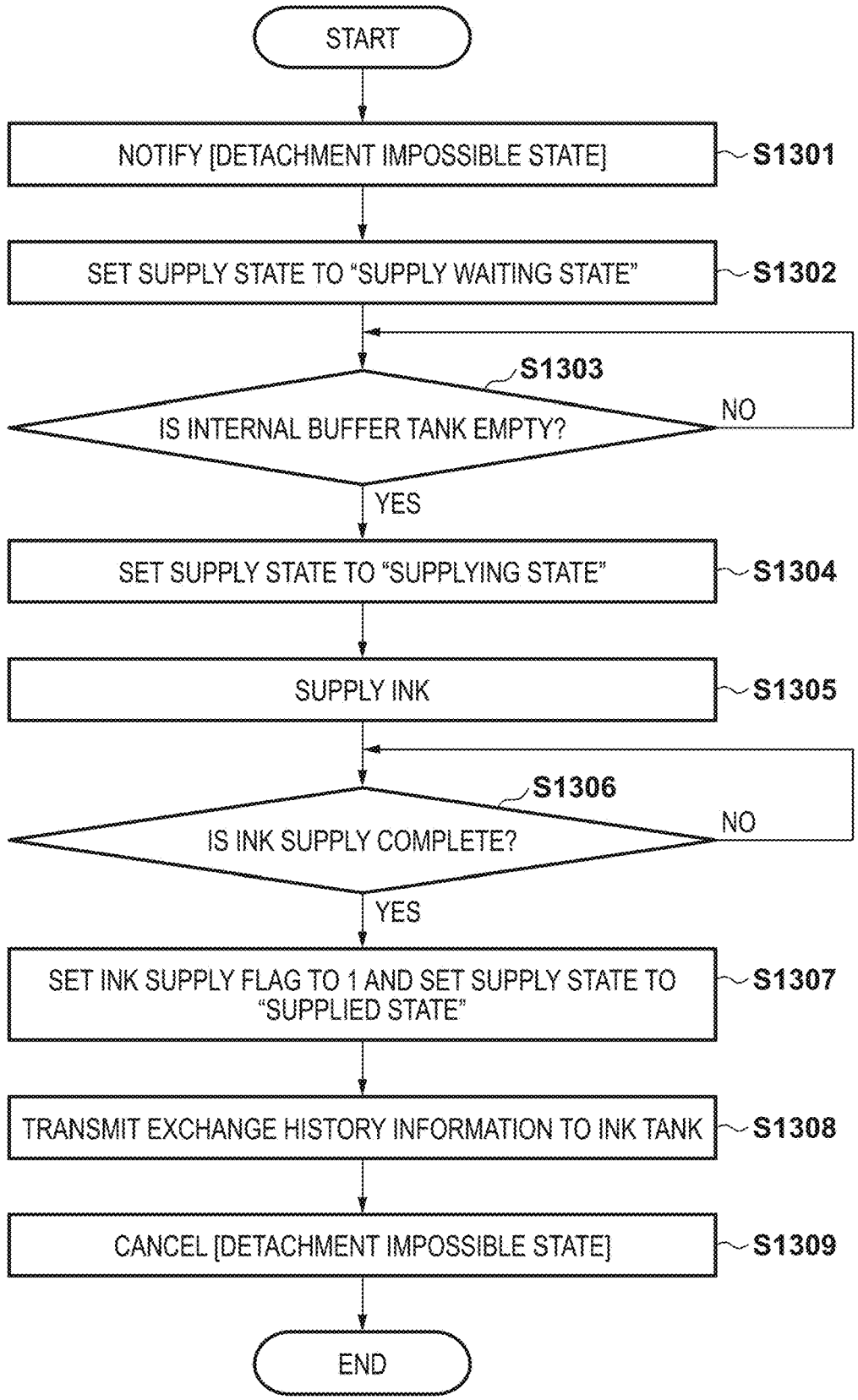
FIG. 13 is a flowchart showing ink supply processing from the ink tank.

FIG. 13 is a flowchart showing ink supply processing from the ink tank in step S1210. In step S1301, the CPU 321 notifies the ink tank 207, by the ink tank exchange possibility 1105, that the ink tank 207 is in the "detachment impossible state". In step S1302, the CPU 321 sets the supply state 1104 to the "supply waiting state". At this time, the combination of information as shown by state number 5 in FIG. 11 is obtained. Next, in step S1303, the CPU 321 monitors an internal buffer tank inside the printing apparatus 100, and determines whether it is in an empty state. Upon determining that the buffer tank is in an empty state, in step S1304, the CPU 321 sets the supply state 1104 to "the supplying state". At this time, the combination of information as shown by state number 6 in FIG. 11 is obtained.

In steps S1305 and S1306, the CPU 321 controls to supply ink from the ink tank 207 to the ink tank unit 106 until judging that the ink supply is completed. Upon determining in step S1306 that ink supply is completed, in step S1307, the CPU 321 sets the supply flag 1102 to "1" and the supply state 1104 to the "supplied state".

In step S1308, the CPU 321 transmits history information such as the date/time of exchange execution to the ink tank 207. In step S1309, the CPU 321 cancels the "detachment impossible state" in step S1301, and notifies the ink tank 207 of the "exchange possible state" as the ink tank exchange possibility 1105. At this time, the combination of information as shown by state number 7 in FIG. 11 is obtained. That is, the CPU 321 sets "possible" to the ink tank exchange possibility in the rack-specific list.

As described above, according to this embodiment, authentication to the ink type and correct position determination are performed at the time of inserting the ink tank. If it is not determined that the position is correct, processing as in step S1211 is performed, and the LED 403 of the ink tank performs light emission processing to indicate an insertion error. As a result, the operator can reduce the possibility of inserting the ink tank to a wrong position. In addition, during ink supply from the ink tank, the ink tank is notified of the detachment impossible state in step S1301, and the LED 403 of the ink tank performs light emission processing to indicate the detachment impossible state. As a result, the operator can reduce the possibility of erroneously detaching the ink tank from the rack during ink supply. These notifications are made by the LED 403 of the ink tank. Hence, without carrying the ink tank to the authentication position to confirm the state of the UI screen or the like or to perform barcode authentication, the operator can judge exchange possibility and an insertion error only by carrying the ink tank to the periphery of the ink tank unit. In addition, as compared to a case in which an insertion error is detected using a contact type IC chip or the like after the ink tank is connected to the ink tank unit, the insertion error can be detected before installation of the ink tank as in step S1211 because short distance wireless communication is used. As a result, the operation by the operator can be performed more efficiently, and the productivity can be improved.

<Printing System>

Figure 17:
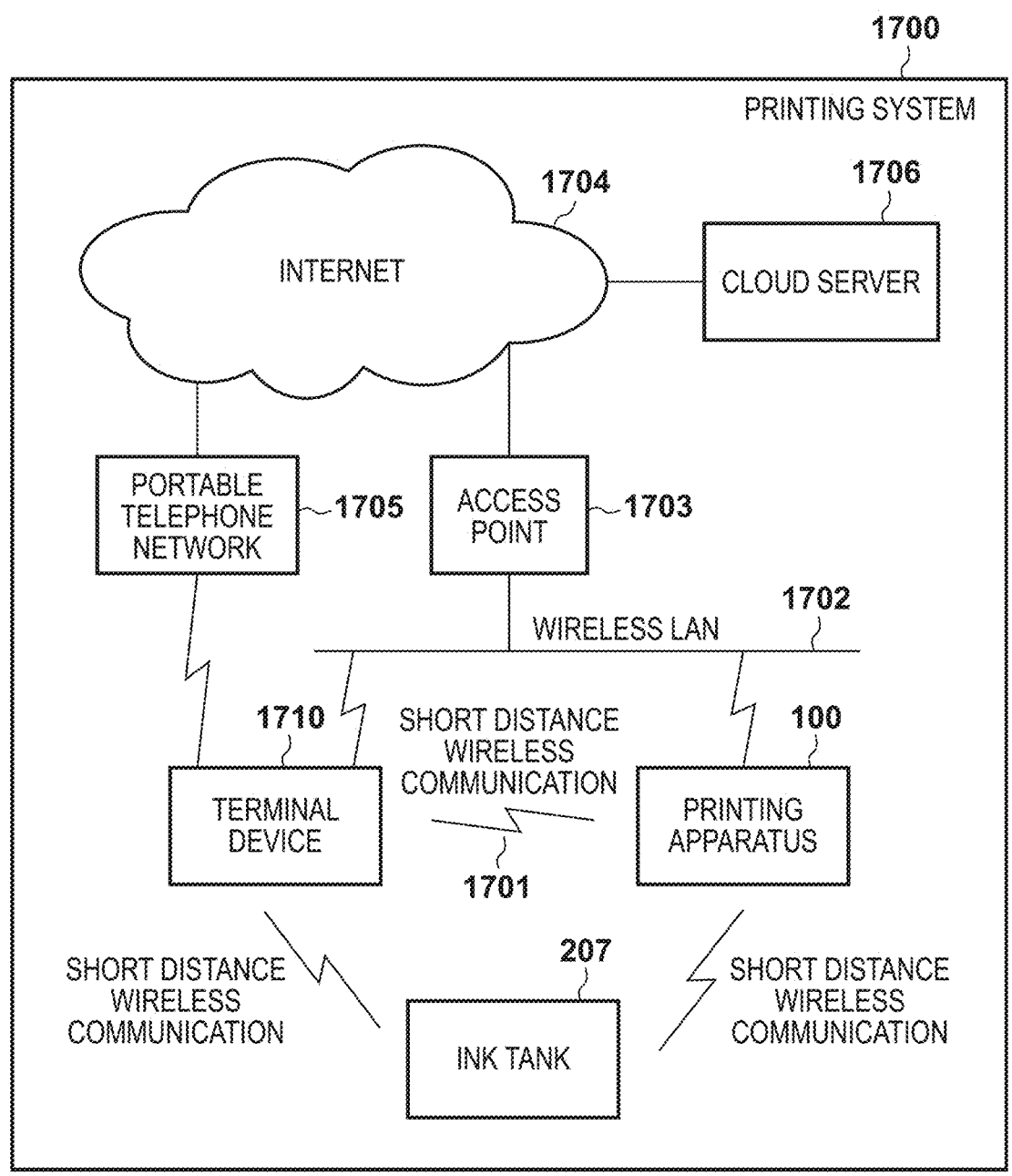
FIG. 17 is a view showing the arrangement of a printing system including the printing apparatus.

FIG. 17 is a view showing the arrangement of a printing system 1700 including the printing apparatus 100. A terminal device 1710, the printing apparatus 100, and the ink tank 207 can communicate with each other by short distance wireless communication 1701. In this embodiment, as the short distance wireless communication 1701, wireless communication complying with the Bluetooth® standard is used. In addition, the terminal device 1710 and the printing apparatus 100 can be connected to each other by a wireless LAN 1702 or via an access point 1703. The access point 1703 has a router function and is connected to the external Internet 1704. The terminal device 1710 and the printing apparatus 100 can also communicate with a cloud server 1706 on the Internet 1704. In addition to the wireless LAN 1702, the terminal device 1710 is also connected to a portable telephone network 1705 and can also be connected to the cloud server 1706 via the portable telephone network 1705.

The arrangement shown in FIG. 17 is an example, and another arrangement can also be employed. For example, the access point 1703 has a router function, as described above. However, the router may be formed by a device different from the access point 1703. The terminal device 1710 can be connected to the Internet 1704 via the access point 1703 using the wireless LAN 1702, as described above. However, the terminal device 1710 may be configured to be communicable only with the printing apparatus 100 by the wireless LAN 1702. In this case, the terminal device 1710 is configured to be communicable with the Internet 1704 and the cloud server 1706 only via the portable telephone network 1705. Furthermore, in the printing system 1700, a plurality of terminal devices 1710 may exist, and some of them may be connected to the printing apparatus 100 only via the wireless LAN 1702.

Figure 20:
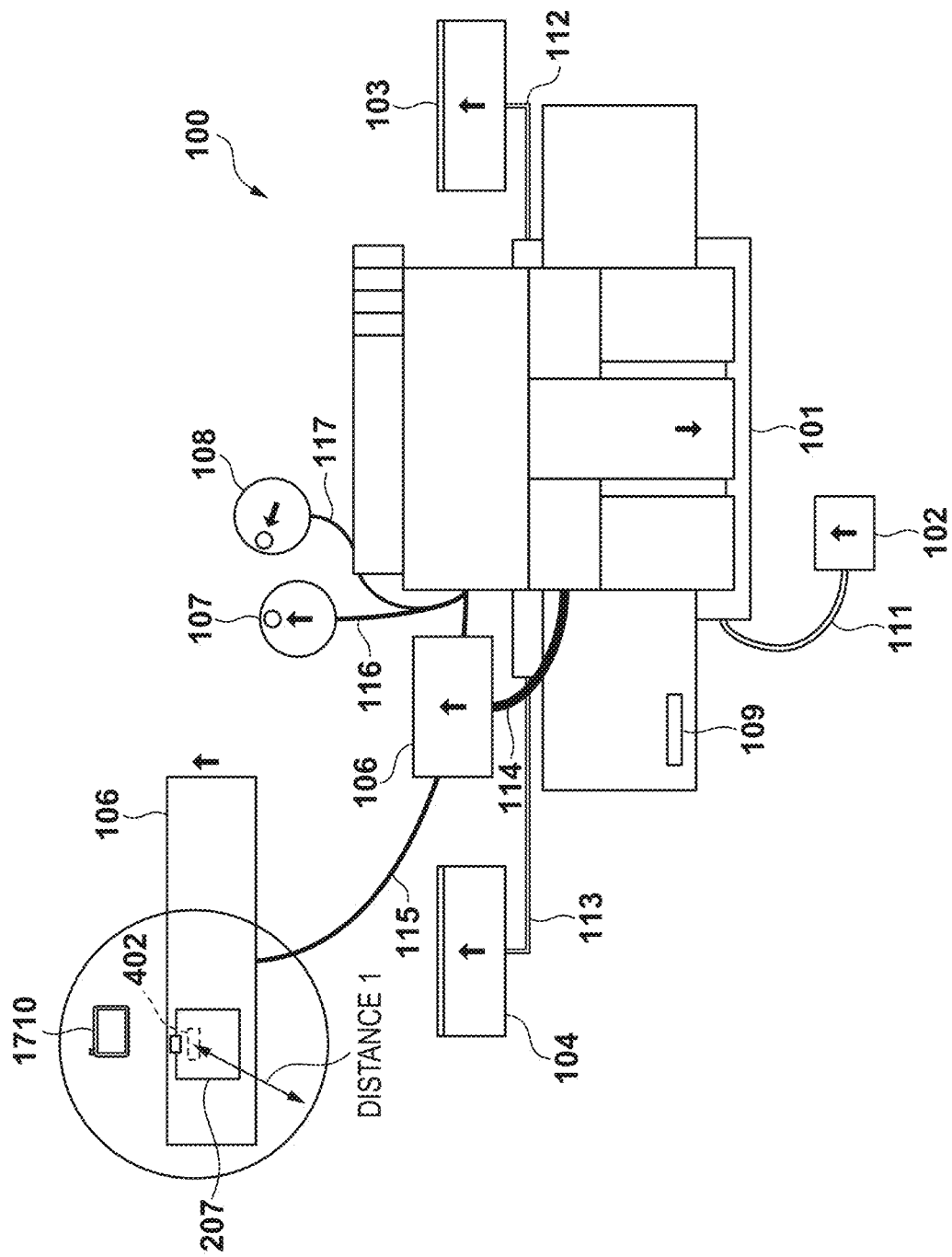
FIG. 20 is a view showing the positional relationship between the ink tank and the terminal device.

Note that in this embodiment, the terminal device 1710 and the ink tank 207 perform short distance wireless communication. The positional relationship between the devices at that time is the positional relationship between the units of the printing apparatus 100, the ink tank 207, and the terminal device 1710 as shown in FIG. 20. If the terminal device 1710 exists within the range of distance 1 from the ink tank 207, as shown in FIG. 20, short distance wireless communication can be performed between the ink tank 207 and the terminal device 1710. The positions of the terminal device 1710 and the ink tank 207 are not limited to the arrangement shown in FIG. 20. Short distance wireless communication between the terminal device 1710 and the ink tank 207 is possible even outside the periphery of the printing apparatus 100.

Furthermore, in this embodiment, the printing apparatus 100 can serve as a server, the terminal device 1710 can serve as a client, and the information of the printing apparatus 100 can be displayed on a touch panel display 1804 of the terminal device 1710 by the wireless LAN 1702. Note that the information of the printing apparatus 100 is displayed using, for example, a web application of the terminal device 1710.

FIG. 18 is a view showing the outer appearance of the terminal device 1710. In this embodiment, a tablet terminal will be explained as an example of the terminal device 1710. The tablet terminal includes a multi-functional plate-shaped portable computer having camera, net browser, and mail functions. A short distance wireless communication unit 1801 is a unit that performs short distance wireless communication, and can communicate with the short distance wireless communication unit of a communication partner located within a predetermined distance. A wireless LAN unit 1802 is a unit configured to perform communication via the wireless LAN 1702, and is arranged in the device. A line connection unit 1803 is a unit configured to perform communication when connected to the portable telephone network, and is arranged in the device. The touch panel display 1804 includes an LCD type display mechanism and a touch panel type operation mechanism, and is formed on the front surface of the terminal device 1710. As an example of an operation method, button-shaped operation parts are displayed on the touch panel display 1804, and when the user performs a touch operation on the touch panel display 1804, an event corresponding to a pressed button is issued. A power supply button 1805 is used to power on/off the terminal device 1710.

Figure 19:
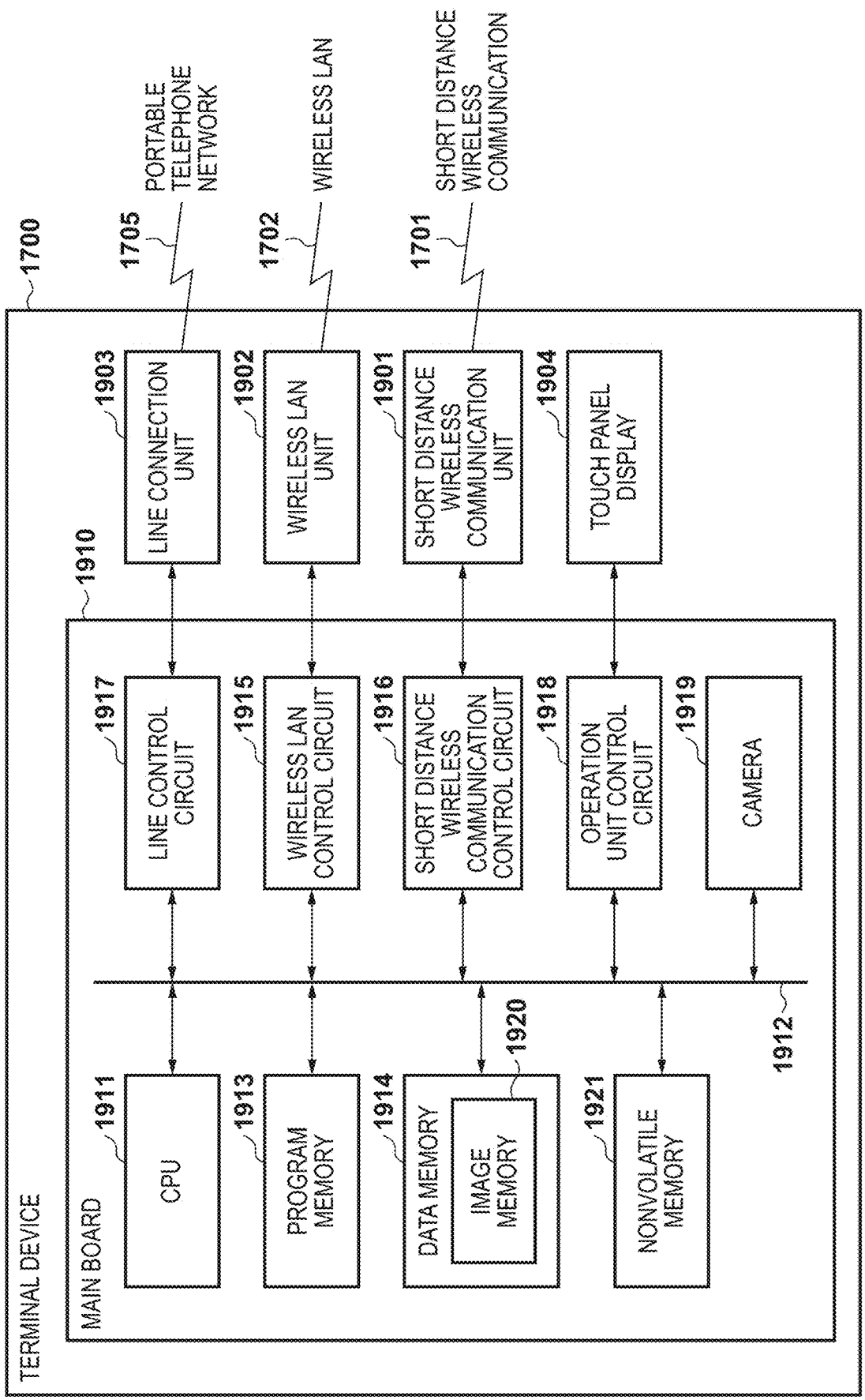
FIG. 19 is a block diagram showing the arrangement of the terminal device.

FIG. 19 is a block diagram showing the arrangement of the terminal device 1710. The terminal device 1710 includes a main board 1910 that comprehensively controls the entire device, a wireless LAN unit 1902, a short distance wireless communication unit 1901, and a line connection unit 1903. A CPU 1911 operates in accordance with a control program stored in a program memory 1913 with a ROM format connected via an internal bus 1912, and data stored in a data memory 1914 of a RAM format.

The CPU 1911 controls the wireless LAN unit 1902 via a wireless LAN control circuit 1915, thereby performing the wireless LAN 1702 with another communication terminal device. In addition, the CPU 1911 controls the short distance wireless communication unit 1901 via a short distance wireless communication control circuit 1916, thereby detecting connection with another short distance wireless communication terminal or transmitting/receiving data to/from another short distance wireless communication terminal. Also, the CPU 1911 controls the line connection unit 1903 via a line control circuit 1917, thereby connecting to the portable telephone network 1705 to perform speech communication or data transmission/reception.

The CPU 1911 also controls an operation unit control circuit 1918, thereby displaying a user interface screen or the like on a touch panel display 1904 or accepting an operation from the user. Also, the CPU 1911 can control a camera 1919 to capture an image, and stores image data acquired by image capturing in an image memory 1920 in the data memory 1914. Other than the captured image, image data acquired from the outside via the portable telephone network 1705, the wireless LAN 1702, or the short distance wireless communication 1701 can be stored in the image memory 1920 or transmitted to the outside. A nonvolatile memory 1921 is formed by a flash memory or the like and can hold data even after power-off. Data to be held includes, for example, telephone directory data, various kinds of communication connection information, and device information of past connection, and additionally, image data that should be saved or application software configured to implement various kinds of functions in the terminal device 1710.

<Communication Between Tank and Terminal Device>

Figure 22:
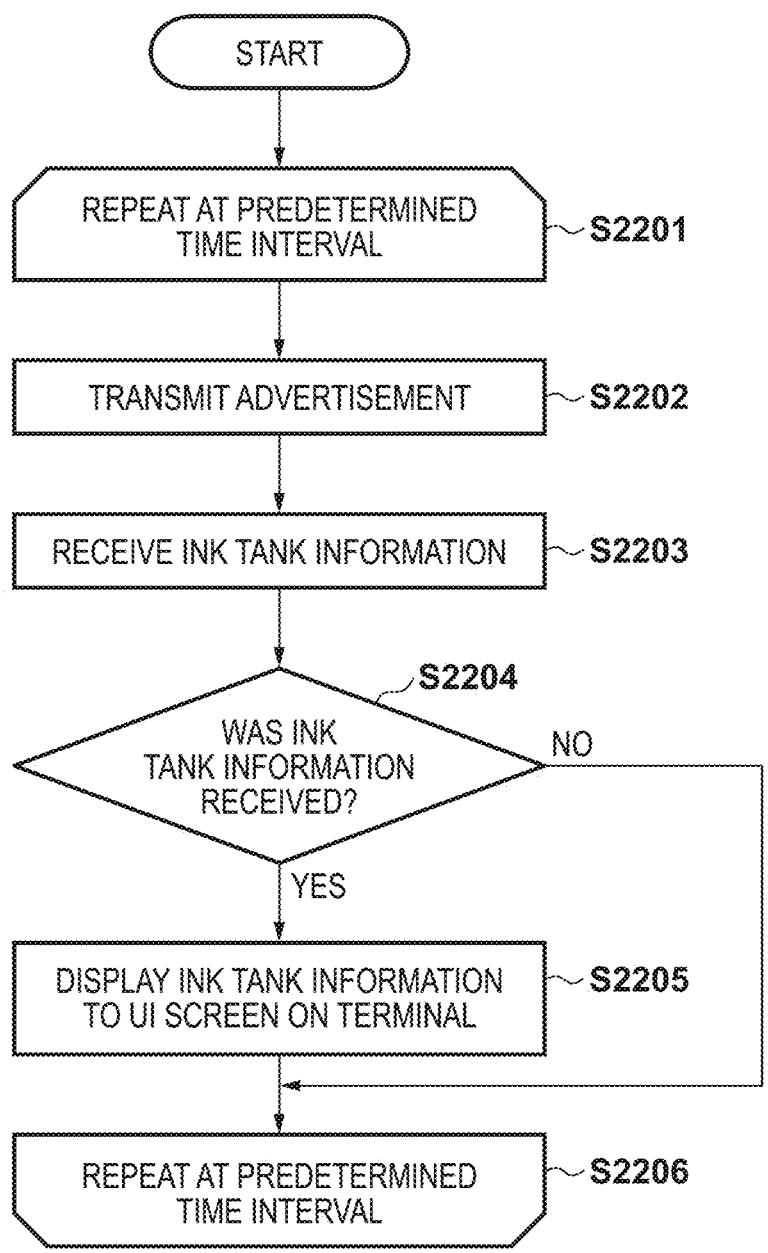
FIG. 22 is a flowchart showing processing of the terminal device.

FIG. 22 is a flowchart showing processing performed when the terminal device 1710 exists near the ink tank 207. The processing shown in FIG. 22 is implemented when, for example, the CPU 1911 loads a program stored in the program memory 1913 and executes it.

If the terminal device 1710 exists within the range of distance 1 in FIG. 20 from the ink tank 207, the CPU 1911 of the terminal device 1710 executes processing. The processing shown in FIG. 22 is activated when the terminal device 1710 is powered on, and executed as background processing. In addition, the processing shown in FIG. 22 is repetitively executed from step S2201 to step S2206 at a predetermined time interval.

In step S2202, the CPU 1911 controls the short distance wireless communication control circuit 1916 to cause the short distance wireless communication unit 1901 to broadcast advertisement information. At this time, radio wave transmission using antennas is performed, as described above, such that the ink tank 207 that has received the advertisement information can acquire position information.

In step S2203, the CPU 1911 receives ink tank information transmitted from the ink tank 207. The ink tank information includes exchange history information received by the ink tank 207 in step S1308 of FIG. 13, ink tank position information, and ink tank identification information. Note that in this embodiment, the reception of the ink tank information is done using BLE as the communication method of short distance wireless communication. However, the communication method is not limited to this. Another communication method, for example, NFC may be used to receive the ink tank information.

In step S2204, the CPU 1911 determines whether the ink tank information from the ink tank 207 has normally been received. Upon determining that the ink tank information from the ink tank 207 has normally been received, the processing in FIG. 22 advances to step S2205. The CPU 1911 stores the acquired ink tank information in the data memory 1914, and displays the ink tank information on the touch panel display 1904 of the terminal device 1710. If there exist a plurality of ink tanks 207, the ink tank information is stored for each ink tank 207, and each information is displayed on the touch panel display 1904. On the other hand, if it is determined that the ink tank information from the ink tank 207 has not normally been received, step S2205 is not executed, and the processing from step S2201 is repeated after a predetermined time.

Here, the ink tank information may be displayed on the touch panel display 1904 by an information display application of the printing apparatus 100, which operates alone on the terminal device 1710. Additionally, for example, the ink tank information may be stored in the ROM 313 of the main unit control unit 310 of the printing apparatus 100, and displayed as a web application on the touch panel display 1904. At this time, in step S2205, the ink tank information stored in the data memory 1914 of the terminal device 1710 is transmitted to the main unit control unit 310 by the wireless LAN 1702. The printing apparatus 100 stores the acquired ink tank information in the ROM 313. As a state in which the ink tank information is reflected on the screen of the UI control unit 317 controlled by the main unit control unit 310 of the printing apparatus 100, the ink tank information is displayed as a web application on the side of the touch panel display 1904 of the terminal device 1710. On the other hand, on the server side of the main unit control unit 310 as well, the same screen may be displayed as a web application on the touch panel display 109 of the printing apparatus 100.

As described above, according to this embodiment, when short distance wireless communication is performed between the terminal device 1710 and the ink tank 207, the operator is allowed to confirm the ink tank information even if the terminal device 1710 does not exist near the printing apparatus 100. In addition, if the terminal device 1710 is located in an area where communication with the printing apparatus 100 via a wireless LAN is possible, the operator can confirm the ink tank information by the web application of the printing apparatus 100. For example, even in a case in which the ink tank 207 is stored in a room different from that of the printing apparatus 100, the operator can confirm information representing whether the ink tank is used or a history such as an exchange date/time by bringing the terminal device 1710 close to the ink tank 207. As a result, for example, the operation efficiency of inventory management or the like can be improved.

Figure 21:
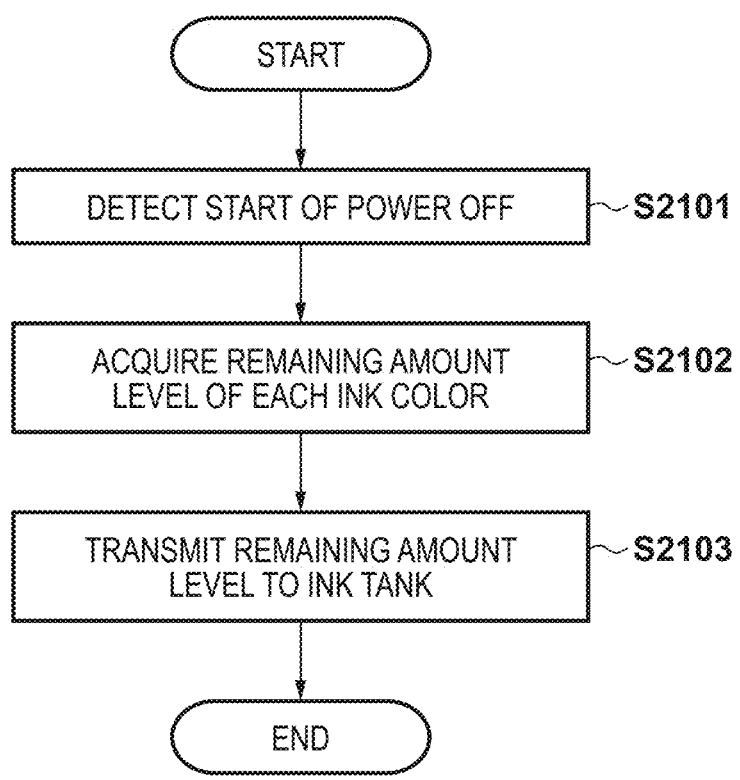
FIG. 21 is a flowchart showing processing of transmitting the remaining amount of ink to the ink tank.

FIG. 21 is a flowchart showing processing of transmitting the remaining amount of ink to the ink tank 207 when the printing apparatus 100 executes power-off processing (power supply cutoff processing). The processing shown in FIG. 21 is implemented when, for example, the CPU 311 loads a program stored in the ROM 313 into the RAM 312 and executes it.

Upon detecting a power-off processing start request in step S2101, in step S2102, the CPU 311 acquires the remaining amount level of each ink color stored in the ROM 313. In step S2103, the CPU 311 transmits the remaining amount level of a color that matches an ink color in the ink tank reception list to each ink tank 207. At this time, the CPU 311 may acquire the ink tank reception list from the ROM 323 of the subunit control unit 320 of the ink tank unit 106. For example, in step S2103, if the CPU 311 acquires "50%" as the black ink remaining amount from the ROM 313, information representing that the remaining amount is 50% is transmitted to the black ink tank 207. Note that step S2103 may be implemented by advertisement transmission by BLE using the short distance wireless communication unit 314. Note that an ink tank that has received the advertisement information determines whether a serial number included in the advertisement information is the same as the serial number of its own. Upon determining that the serial numbers are the same, the ink tank recognizes that it is the remaining amount of its own, and stores the remaining amount information included in the advertisement information.

Hence, even if the printing apparatus 100 is powered off, the operator can confirm the remaining amount level of the ink tank by short distance wireless communication between the terminal device 1710 and the ink tank 207. In this case, as described above, the ink tank information may be displayed on the touch panel display 1904 by the information display application of the printing apparatus 100, which operates alone on the terminal device 1710.

As described above, according to this embodiment, the terminal device 1710 and the ink tank 207 perform short distance wireless communication, thereby allowing the operator to confirm the remaining amount of ink even if the printing apparatus 100 is in a power-off state. In addition, even if the printing apparatus 100 is powered off alone, the operator can confirm the remaining amount of ink by performing short distance wireless communication near the ink tank 207.

Second Embodiment

In the first embodiment, a case in which as for the area where the operator performs the ink tank exchange operation, the operation is performed only in one direction from the front side of the ink tank unit 106 has been described. However, since the arrangement of the units of the printing apparatus 100 is changeable, the exchange areas may be constructed such that the operation can be performed from directions of both surfaces of the ink tank unit 106. In the second embodiment, a case in which the exchange operation can be performed from directions of both surfaces of an ink tank unit 106 will be described. The second embodiment will be described below concerning points different from the first embodiment.

Figure 15:
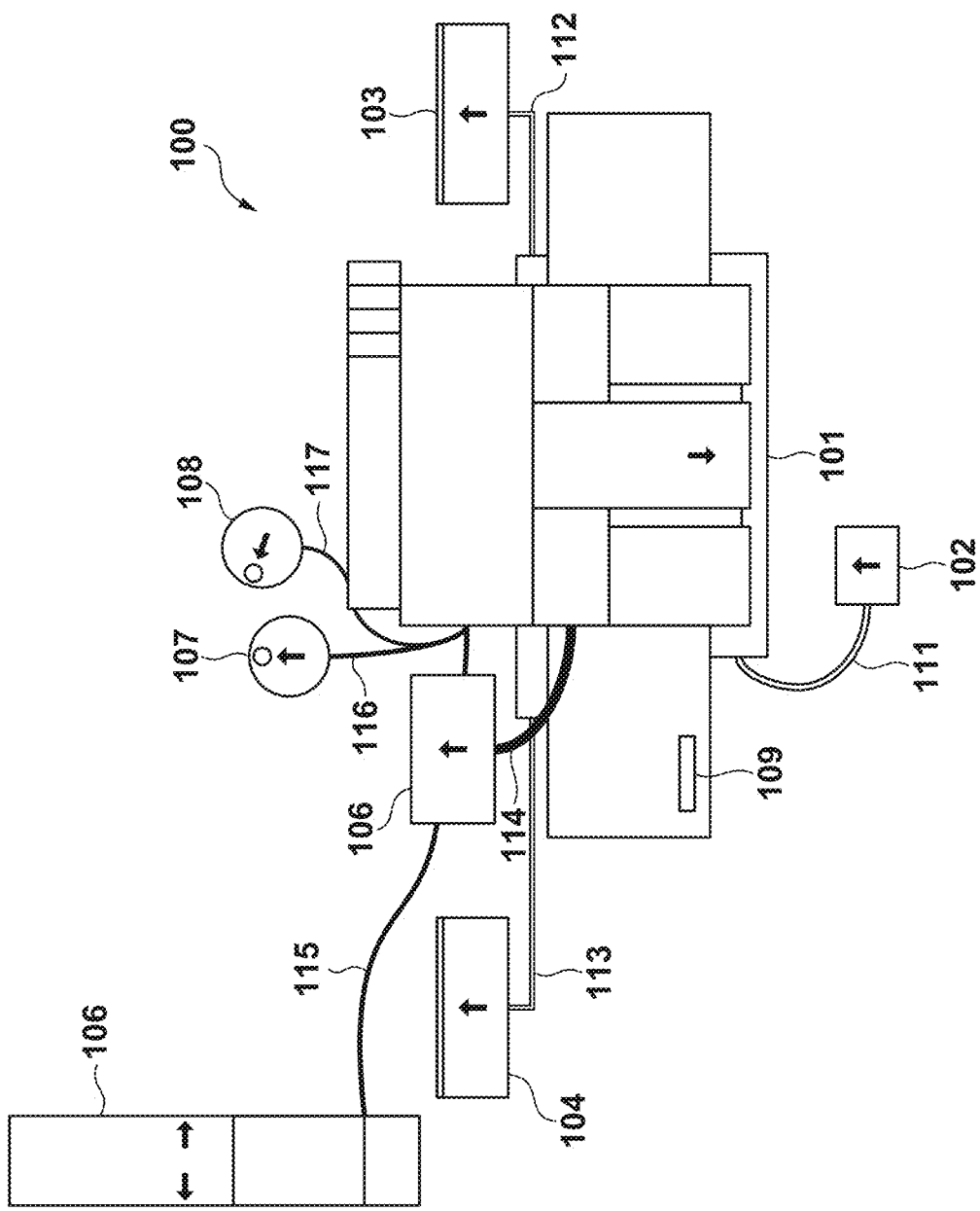
FIG. 15 is a view showing a printing apparatus viewed from above.

FIG. 15 is a view showing the overall arrangement of a printing apparatus 100 in a case in which an ink tank unit 106 in the arrangement of the printing apparatus 100 shown in FIG. 1 is arranged at a position where an exchange operation of an ink tank 207 can be performed from two directions. In the arrangement shown in FIG. 15, the ink tank exchange operation can be performed from directions of both surfaces, as indicated by arrows in the ink tank unit 106.

Figure 16:
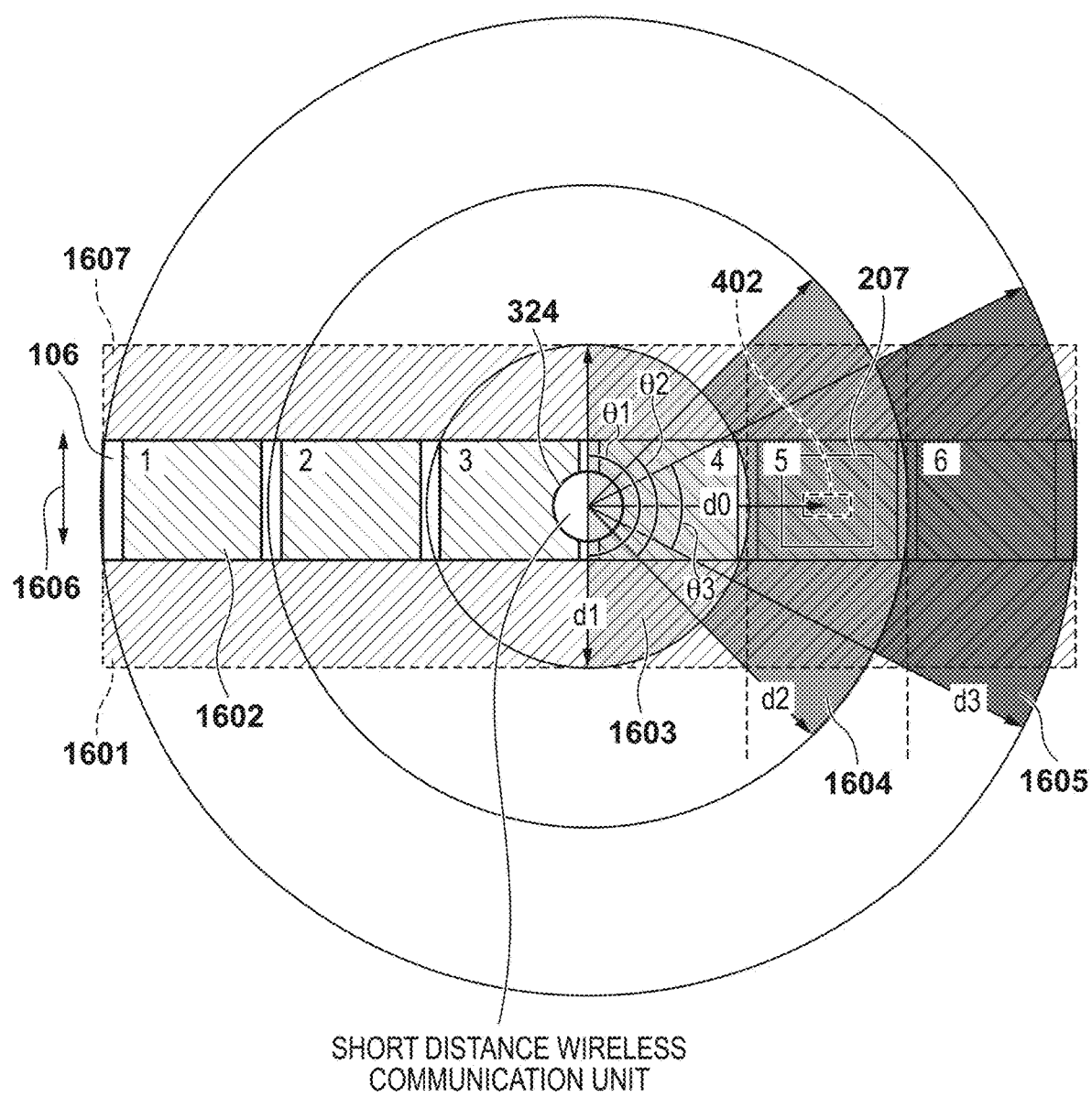
FIG. 16 is a view showing an ink tank unit viewed from above.

FIG. 16 is a view showing the positional relationship between the ink tank unit 106 and the ink tank 207 according to this embodiment. As described above, an operator can perform the exchange operation of the ink tank 207 from two directions of the ink tank unit 106 indicated by an arrow 1606. In this embodiment, a short distance wireless communication unit 324 of the ink tank unit 106 is arranged at the center of the ink tank unit 106 in the direction of the arrow 1606. In addition, a short distance wireless communication unit 402 of the ink tank 207 is arranged at the center of the ink tank unit 106 in the direction of the arrow 1606. That is, when the ink tank 207 is installed in an installation rack, the short distance wireless communication unit 402 of the ink tank 207 and the short distance wireless communication unit 324 are located at positions linearly arranged in the front horizontal direction.

FIG. 16 shows an arrangement in which a reference exchange area 1401 in FIG. 14 is extended in two directions of both surfaces of the ink tank unit 106. That is, a reference exchange area 1601 has an arrangement with the reference exchange area 1401 in FIG. 14 provided on both surfaces of the ink tank unit 106. A rack area 1602 is provided from one end to the other end of the ink tank unit 106 in the direction of the arrow 1606 such that the ink tank 207 can be inserted from both surfaces of the ink tank unit 106. Exchange areas 1603, 1604, and 1605 have an arrangement in which the exchange areas 1403, 1404, and 1405 in FIG. 14 are extended in the directions of both surfaces of the ink tank unit 106. That is, θ1 of the exchange area 1603 is an angle twice larger than θ1 of the exchange area 1403 in FIG. 14. In addition, θ2 of the exchange area 1604 is an angle twice larger than θ2 of the exchange area 1404 in FIG. 14. Also, θ3 of the exchange area 1605 is an angle twice larger than θ3 of the exchange area 1405 in FIG. 14.

In the arrangement shown in FIG. 16, an operation of the ink tank unit 106 to detect the ink tank 207 is the same as described in the first embodiment except that the reference exchange area and the exchange areas are extended to both surfaces of the ink tank unit 106. That is, the operation of detecting the ink tank 207 in the first embodiment can be executed on both surfaces of the ink tank unit 106.

Additionally, in the arrangement shown in FIG. 16, the reference exchange area and the exchange areas may be provided such that the size of the exchange areas can be switched between the size in directions of both surfaces of the ink tank unit 106 and the size in one direction. For example, in the arrangement shown in FIG. 16, the reference exchange area and the exchange areas only in one direction of the ink tank unit 106 may be disabled. For example, the angle information of the rack area and the angle information of the exchange areas in the rack-specific list are changed such that they correspond to only one direction of the ink tank unit 106. In this arrangement, for example, it is determined which direction of the ink tank unit 106 the angle information of the ink tank 207 received in step S904 of FIG. 9 corresponds to. If the ink tank 207 is located on a disabled side as the result of the determination, the subsequent detection operation is not performed.

The above-described disabling may be done in accordance with the arrangement of the ink tank unit 106. For example, the above-described disabling may be performed in accordance with the measurement result of the relative position between a short distance wireless communication unit 314 of a main unit 101 and the short distance wireless communication unit 324 of the ink tank unit 106.

As described above, according to this embodiment, it is possible to extend the detection area of the ink tank 207.

In the above-described embodiments, exchange of the ink tank 207 has been described as an example. However, the embodiments may be applied not only to the ink tank 207 but also to another consumable member. For example, even when exchanging a consumable liquid tank 206, an insertion error of the tank can be prevented by the same arrangement. Not only for a liquid tank such as the ink tank 207 or the consumable liquid tank 206, in a case in which an installation place is decided by the type of a consumable member, an insertion error can be prevented by applying the operation of this embodiment. For example, the same effect as described above can be obtained by applying the operation not only to exchange of the liquid tank but also to exchange of the printhead.

Additionally, in this embodiment, an arrangement in which the short distance wireless communication unit 324 is provided at one point of the ink tank unit 106 including a plurality of installation racks has been described. However, the short distance wireless communication unit 324 may be provided in each installation rack. In this case, since the angle information of the ink tank 207 is acquired from the short distance wireless communication unit 324 of each installation rack, the detection of the position of the ink tank 207 can be raised. Additionally, in this embodiment, Bluetooth5.1 is used as the communication method of the short distance wireless communication. However, another communication method capable of detecting a distance and a direction may be used.

The present invention is not limited to the above embodiments, and various changes and modifications can be made within the spirit and scope of the present invention. Therefore, to apprise the public of the scope of the present invention, the following claims are made.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-103178, filed May 31, 2019, which is hereby incorporated by reference herein in its entirety.

What is claimed is:

1. A printing apparatus including a subunit including a plurality of installation racks in each of which a consumable member can be installed, and a main unit configured to receive supply from the consumable member installed in the subunit and perform printing, comprising:
    at least one memory having stored thereon instructions;
    at least one processor for executing the instructions to operate as:
    an acquisition unit to acquire consumable member information including (i) color information and (ii) information indicating a positional relationship between the subunit and the consumable member, wherein the information indicating the positional relationship includes a direction and a distance between the subunit and the consumable member;
    a storage unit to store information, including the color information and information indicating a positional relationship between the subunit and the consumable member, of each of the plurality of installation racks; and
    a determination unit to determine, based on the acquired consumable member information and the stored information, whether the consumable member exists at a position corresponding to a predetermined installation rack of the plurality of installation racks.

2. The apparatus according to claim 1, wherein the determination includes determining whether the consumable member exists in an area on a periphery of the subunit corresponding to the predetermined installation rack of the plurality of installation racks.

3. The apparatus according to claim 1, wherein the determination includes determining whether the consumable member exists in the predetermined installation rack of the plurality of installation racks.

4. The apparatus according to claim 1, further comprising a controller configured to turn on a lighting unit provided on the consumable member,
    wherein if it is determined that the consumable member does not exist at the position corresponding to the predetermined installation rack of the plurality of installation racks, the control unit controller turns on the lighting unit in a first state.

5. The apparatus according to claim 1, wherein if it is determined that the consumable member exists at the position corresponding to the predetermined installation rack of the plurality of installation racks, the consumable member is set in a state in which the consumable member is usable in the main unit.

6. The apparatus according to claim 5, further comprising a controller configured to turn on a lighting unit provided on the consumable member,
wherein if the consumable member is set in the state in which the consumable member is usable in the main unit, the controller turns on the lighting unit in a second state.

7. The apparatus according to claim 1, wherein the instructions are further executed to operate as:
a second acquisition unit to acquire a remaining amount of the consumable member; and
a transmission unit to transmit the remaining amount of the consumable member acquired by the second acquisition unit to the consumable member.

8. The apparatus according to claim 7, wherein when executing processing of cutting off a power supply of the printing apparatus, the transmission unit transmits the remaining amount of the consumable member acquired by the third second acquisition unit to the consumable member.

9. The apparatus according to claim 1, wherein the consumable member includes ink.

10. A method of controlling a printing unit including a subunit including a plurality of installation racks in each of which a consumable member can be installed, and a main unit configured to receive supply from the consumable member installed in the subunit and perform printing, comprising:
acquiring consumable member information including (i) color information and (ii) information indicating a positional relationship between the subunit and the consumable member, wherein the information indicating the positional relationship includes a direction and a distance between the subunit and the consumable member;
storing information, including the color information and information indicating a positional relationship between the subunit and the consumable member, of each of the plurality of installation racks; and
determining, based on the acquired consumable member information and the stored information, whether the consumable member exists at a position corresponding to a predetermined installation rack of the plurality of installation racks.

11. The method according to claim 10, wherein the determining includes determining whether the consumable member exists in an area on a periphery of the subunit corresponding to the predetermined installation rack of the plurality of installation racks.

12. The method according to claim 10, wherein the determining includes determining whether the consumable member exists in the predetermined installation rack of the plurality of installation racks.

13. The apparatus according to claim 10, further comprising turning on a lighting unit provided on the consumable member,
wherein if it is determined that the consumable member does not exist at the position corresponding to the predetermined installation rack of the plurality of installation racks, the lighting unit is turned on in a first state.

14. The apparatus according to claim 10, wherein if it is determined that the consumable member exists at the position corresponding to the predetermined installation rack of the plurality of installation racks, the consumable member is set in a state in which the consumable member is usable in the main unit.

15. The apparatus according to claim 14, further comprising turning on a lighting unit provided on the consumable member,
if the consumable member is set in the state in which the consumable member is usable in the main unit, the lighting unit is turned on in a second state.

16. The apparatus according to claim 10 further comprising:
acquiring a remaining amount of the consumable member; and
transmitting the remaining amount of the acquired consumable member acquired to the consumable member.

17. The apparatus according to claim 16, wherein when cutting off a power supply of the printing apparatus, transmitting the remaining amount of the acquired consumable to the consumable member.

18. The apparatus according to claim 10, wherein the consumable member includes ink.

* * * * *